(12) United States Patent
Akutsu et al.

(10) Patent No.: US 9,151,925 B2
(45) Date of Patent: Oct. 6, 2015

(54) IMAGE PICKUP LENS UNIT AND METHOD FOR MANUFACTURING IMAGE PICKUP LENS UNIT

(71) Applicants: Dai Akutsu, Nerima-ku (JP); Kazuhiro Wada, Hachioji (JP); Hajime Mori, Fuchu (JP)

(72) Inventors: Dai Akutsu, Nerima-ku (JP); Kazuhiro Wada, Hachioji (JP); Hajime Mori, Fuchu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/348,498

(22) PCT Filed: Sep. 27, 2012

(86) PCT No.: PCT/JP2012/074878
§ 371 (c)(1),
(2) Date: Mar. 28, 2014

(87) PCT Pub. No.: WO2013/047653
PCT Pub. Date: Apr. 4, 2013

(65) Prior Publication Data
US 2014/0233115 A1    Aug. 21, 2014

(30) Foreign Application Priority Data

Sep. 30, 2011 (JP) ................................. 2011-217806

(51) Int. Cl.
| | |
|---|---|
| *G02B 7/02* | (2006.01) |
| *B29D 11/00* | (2006.01) |
| *G02B 7/00* | (2006.01) |
| *G02B 13/00* | (2006.01) |
| *B29C 45/14* | (2006.01) |
| *B29L 11/00* | (2006.01) |

(52) U.S. Cl.
CPC .......... *G02B 7/003* (2013.01); *B29C 45/14065* (2013.01); *B29C 45/14778* (2013.01);
(Continued)

(58) Field of Classification Search
CPC .......... G02B 7/003; G02B 7/02; G02B 7/021; G02B 7/026; G02B 13/0025; G02B 13/006; B29C 45/00; B29C 45/14065; B29C 45/14778; B29C 2045/14122; B29C 2045/14131; B29C 2045/14139; B29D 11/00009; B29D 11/00192; B29D 2011/0016
USPC ............. 359/811, 819, 738; 264/1.7, 2.2, 2.3, 264/2.7, 246, 247; 362/238, 335
See application file for complete search history.

(56) References Cited

U.S. PATENT DOCUMENTS

| | | | |
|---|---|---|---|
| 5,526,455 A * | 6/1996 | Akita et al. ..................... | 385/93 |
| 6,266,197 B1 * | 7/2001 | Glenn et al. ................... | 359/819 |

(Continued)

FOREIGN PATENT DOCUMENTS

| | | |
|---|---|---|
| JP | 60-196317 | 10/1985 |
| JP | 2000-260796 | 9/2000 |

(Continued)

*Primary Examiner* — Loha Ben
(74) *Attorney, Agent, or Firm* — Cozen O'Connor

(57) ABSTRACT

Since the lens (10) includes the alignment portions (14), the lens (10) is positioned with high precision with respect to the second mold (61) during molding of the holder member (40), and the holder member (40) and the lens (10) are positioned with each other with high precision. Further, since the positioning of the lens (10) with respect to the second mold (61) may be performed using the alignment portions (14) provided outside the second optical surface (13*e*), influence of the heat and pressure produced by the second mold (61) and the resin during molding of the holder member (40) on the second optical surface (13*e*) of the lens (10) may be reduced. Therefore, occurrence of degradation, such as distortion, in the second optical surface (13*e*) of the lens (10) during molding of the holder member (40) may be prevented.

18 Claims, 23 Drawing Sheets

(52) U.S. Cl.
CPC ........ *B29D11/00009* (2013.01); *G02B 13/006* (2013.01); *G02B 13/0025* (2013.01); *B29C 2045/14131* (2013.01); *B29C 2045/14139* (2013.01); *B29D 11/00192* (2013.01); *B29L 2011/0016* (2013.01); *G02B 7/026* (2013.01)

(56) References Cited

U.S. PATENT DOCUMENTS

| | | | |
|---|---|---|---|
| 6,441,976 B1 * | 8/2002 | Okorocha | 359/820 |
| 6,728,048 B2 * | 4/2004 | Takase | 359/819 |
| 6,791,076 B2 * | 9/2004 | Webster | 250/239 |
| 7,092,174 B2 * | 8/2006 | Yamaguchi et al. | 359/819 |
| 7,663,199 B2 * | 2/2010 | Lee et al. | 257/433 |
| 7,842,203 B2 * | 11/2010 | Kadowaki et al. | 264/2.2 |
| 2013/0271859 A1 * | 10/2013 | Mori et al. | 359/819 |
| 2014/0016216 A1 * | 1/2014 | Mori et al. | 359/811 |
| 2014/0334019 A1 * | 11/2014 | Ishiguri et al. | 359/738 |

FOREIGN PATENT DOCUMENTS

| | | |
|---|---|---|
| JP | 2009-300626 | 12/2009 |
| WO | WO 2012/133451 | 10/2012 |

* cited by examiner

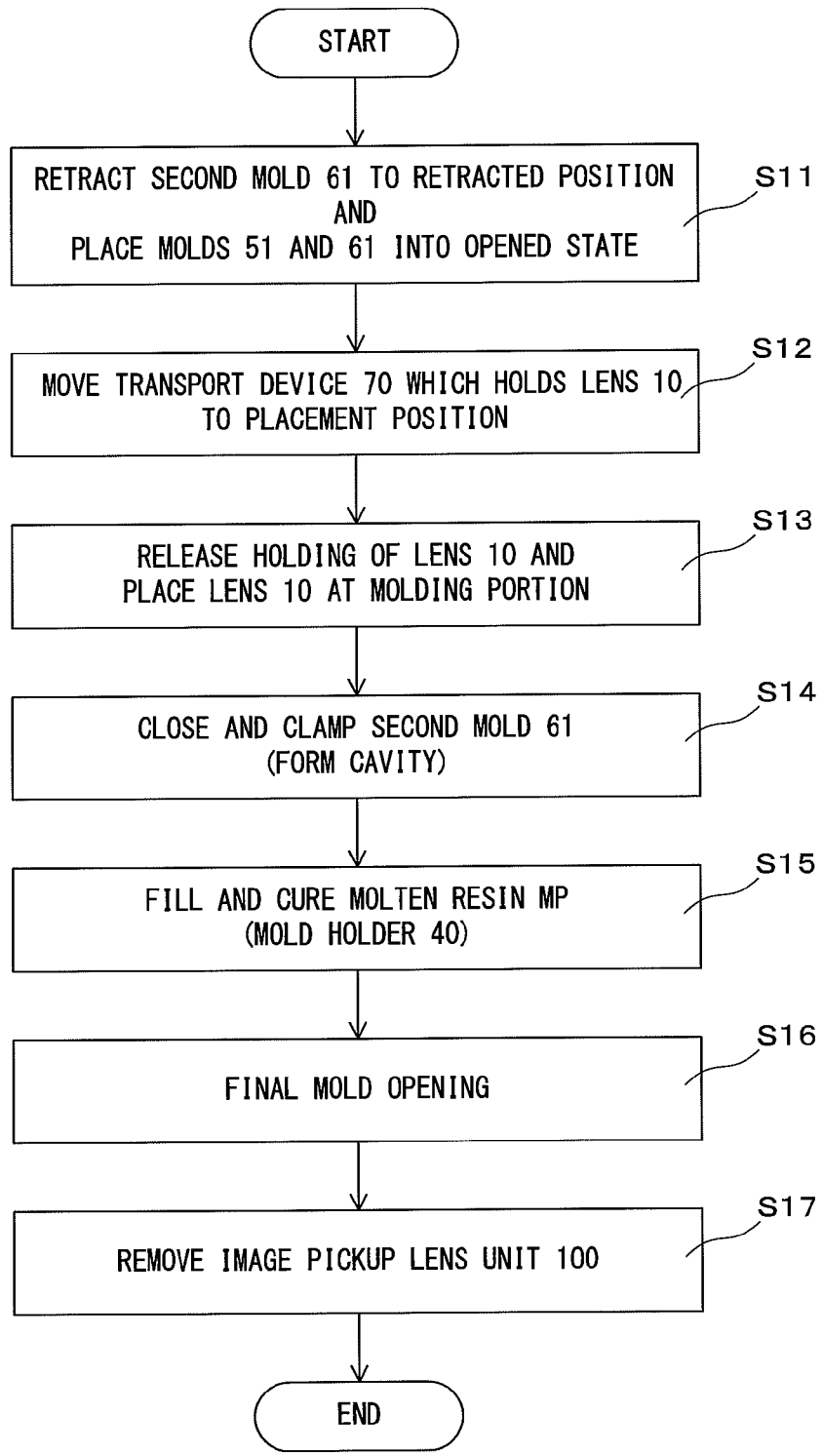

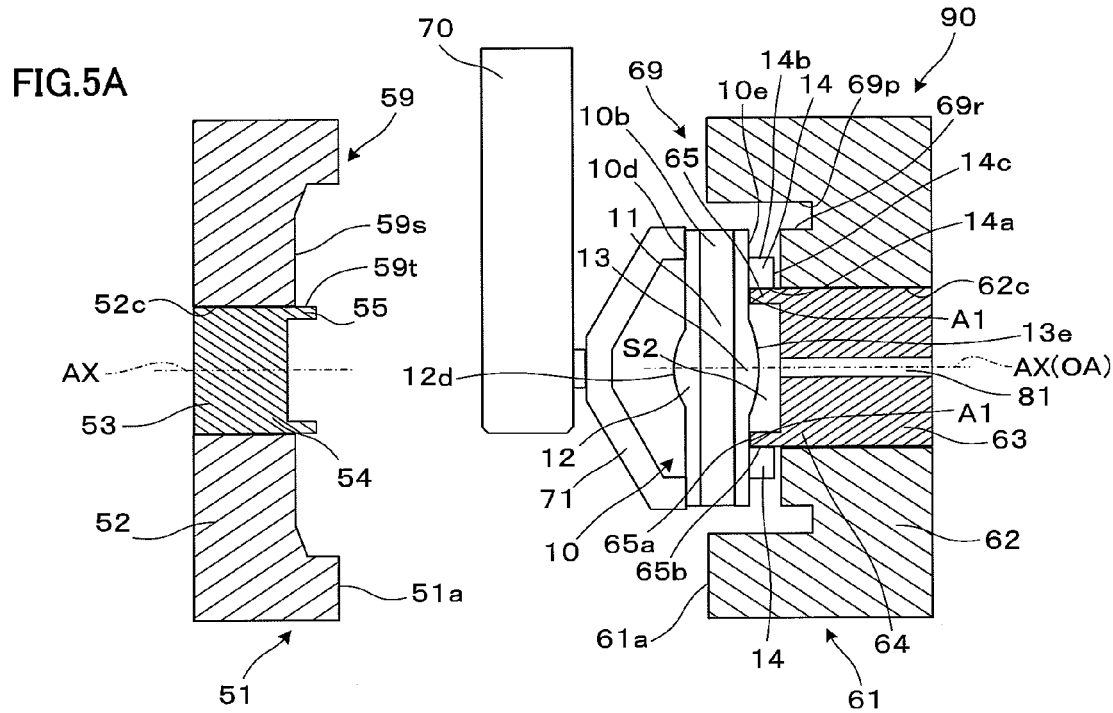
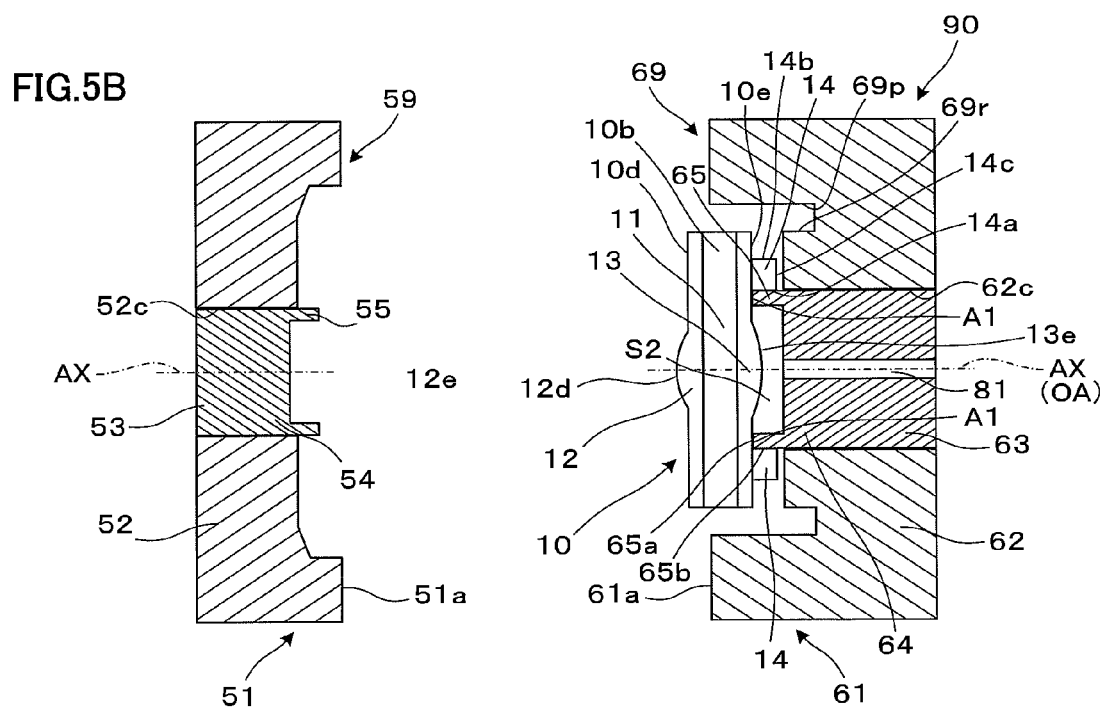

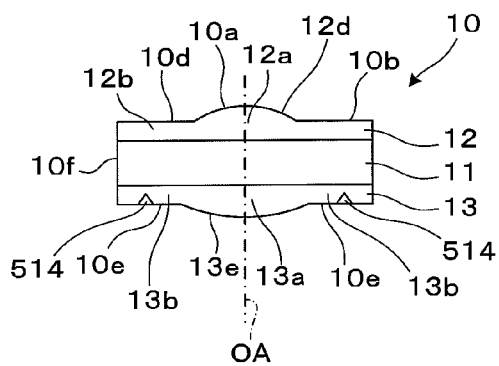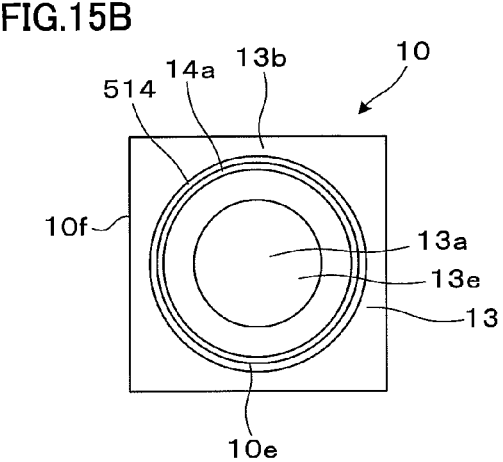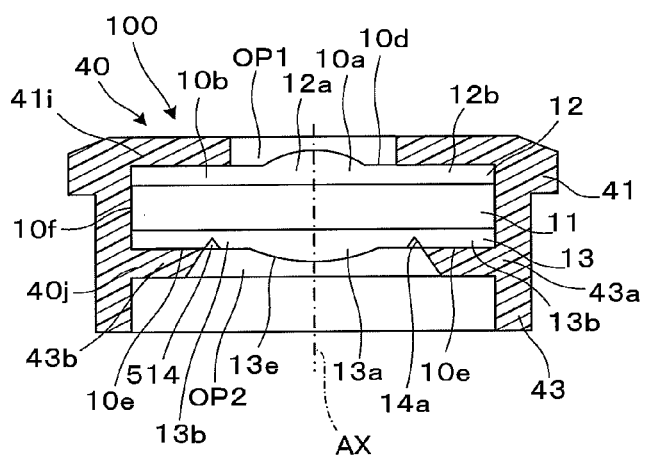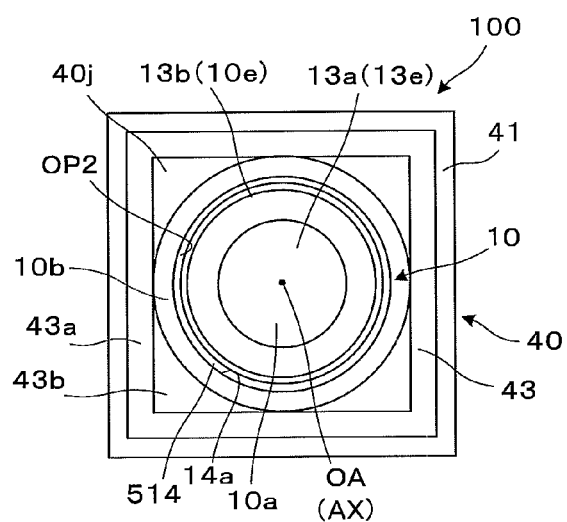

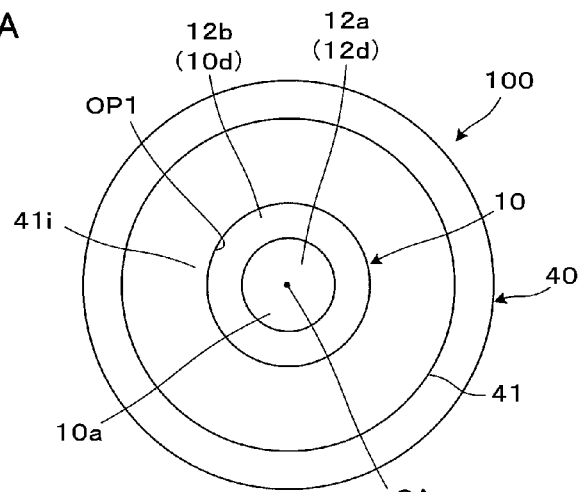
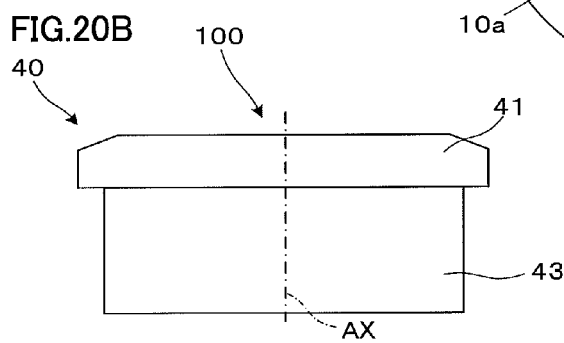
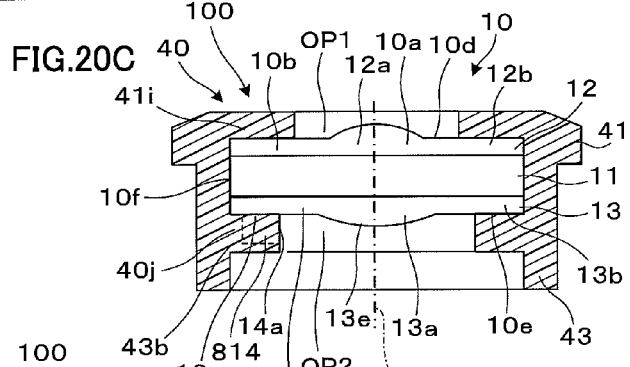
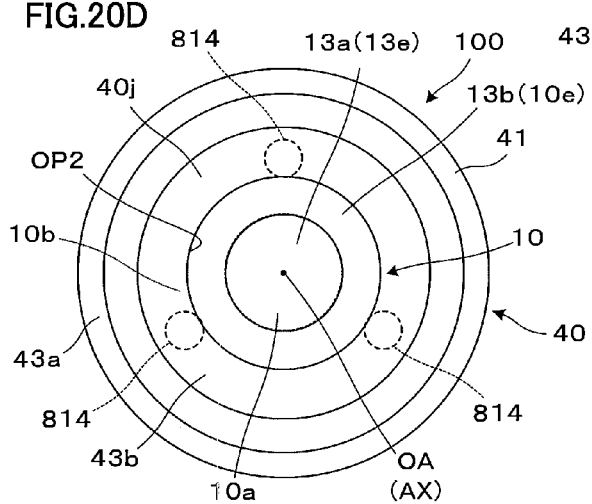

IMAGE PICKUP LENS UNIT AND METHOD FOR MANUFACTURING IMAGE PICKUP LENS UNIT

RELATED APPLICATIONS

This is a U.S. National stage of International application No. PCT/JP2012/074878 filed on Sep. 27, 2012.

This patent application claims the priority of Japanese application no. 2011-217806 filed Sep. 30, 2011, the disclosure content of which is hereby incorporated by reference.

TECHNICAL FIELD

The present invention relates to an image pickup lens unit in which a lens is assembled into a holder, and to a method for manufacturing an image pickup lens unit.

BACKGROUND ART

An image pickup lens unit assembled into, for example, a mobile phone has a structure to retain a periphery of an optical lens for imaging by a holder. Significantly high positioning accuracy needs to be ensured in assembling the optical lens into the holder and, therefore, such an assembling is typically performed by using an automatic assembling system which has adopted an image recognition technique. Such a system, however, is very expensive and requires a very large area to configure a manufacturing line in which an insertion process for inserting the lens in the holder, a bonding process for bonding the lens to the holder, and the like are provided separately. Therefore, replacement of the equipment performed each time when the kind or type of lens is changed becomes large in scale and requires increased numbers of work steps.

As a manufacturing method for solving such problems, a technique to collectively assembling an image pickup lens unit by, after placing and positioning a lens and a diaphragm within a mold in advance with reference to an outer edge of the lens, forming a holder by injection molding on the periphery of the lens and the like is known (see Patent Literature 1).

In the manufacturing method of Patent Literature 1, however, in a case in which a lens diced from a wafer level lens is used, the following problem occurs: since a degree of eccentricity of an outer edge of the lens and an optical surface depends on the dicing precision of the wafer level lens, if misalignment (or eccentricity) is caused between the outer edge of the lens and the optical surface, it is difficult to obtain satisfactory optical performance.

CITATION LIST

Patent Literature

Japanese Unexamined Patent Application Publication No. 2009-300626

SUMMARY OF INVENTION

An object of the present invention is to provide an image pickup lens unit in which a holder member and a lens are positioned with each other with high precision regardless of an outer edge shape of the lens.

Another object of the present invention is to provide a method for manufacturing an image pickup lens unit capable of molding a holder member while a lens is being positioned with respect to a mold regardless of an outer edge shape of the lens.

In order to achieve the above-described objects, an image pickup lens unit according to the present invention is an image pickup lens unit, including: a lens which includes a first optical surface and a second optical surface formed on the opposite side of the first optical surface; and a holder member integrally molded to hold the lens therein with the first and second optical surfaces being exposed, wherein the lens includes an alignment portion for positioning the lens with respect to a mold when the lens is placed in the mold which has a molding space for molding the holder member; and wherein the alignment portion is provided outside of any one of the first and second optical surfaces and at least a part of the inside of the alignment portion is exposed from the holder member. Here, the reason that at least a part of the inside of the alignment portion is exposed from the holder member is that the holder member is molded in a state in which the lens is aligned by each positioning portion (which may be a positioning portion that functions also as a support portion) provided in the mold being in contact with at least a part of the inside of the alignment portion. If a clearance, i.e., a gap, between the lens and the positioning portion of the mold is substantially zero, all the positioning locations are exposed. If the clearance is large and there is rattling between the lens and the mold, only the part at which the lens and the mold come in contact with each other is exposed. Thus, positioning accuracy between the lens and the holder member may be checked in a simple manner using the exposed location. It is obvious that the location of the positioning portion and the size of a contact portion should be considered so that defects, such as ghost, are not caused by reflection at this exposed portion. The inside of the alignment portion refers to an area of the alignment portion on the side of the optical surface when a line which passes the center of the alignment portion and is vertical to a line which connects the center of the optical surface and the center of the alignment portion is drawn (see FIG. 3C).

According to the image pickup lens unit described above, since the lens includes the alignment portion, the lens is positioned with high precision with respect to the mold during molding of the holder member, and the holder member and the lens are positioned with each other with high precision. Further, since the positioning of the lens with respect to the mold may be performed using the alignment portion provided outside the optical surface, influences of the heat and pressure produced by the mold or resin during molding of the holder member on the optical surface may be reduced. Therefore, occurrence of degradation, such as distortion, in the optical surface of the lens during molding of the holder member may be prevented. Since the lens is positioned with respect to the mold by the inside of the alignment portion, the size of an opening of the image pickup lens unit may be reduced as compared with a case in which the lens is positioned outside the alignment portion.

In a specific aspect of the present invention, in the image pickup lens unit, the alignment portion is formed integrally with a part outside of any one of the first and second optical surfaces of the lens. In this case, the alignment portion may be easily molded together with the lens.

In another aspect of the present invention, the alignment portion includes at least one of protrusion and recession in shape with respect to a surface other than the first or second optical surface of the lens. In this case, alignment in the direction vertical to the lens optical axis may be performed easily by the protrusion or recession in shape.

In yet another aspect of the present invention, the alignment portion includes a stepped portion with respect to a flat surface of an outer peripheral portion extending from an outer edge of the first or second optical surface. In this case, alignment in the direction vertical to the lens optical axis may be performed reliably by the stepped portion between the flat surface of the outer peripheral portion extending from the outer edge of the first or second optical surface and the alignment portion.

In yet another aspect of the present invention, at least two alignment portions are provided in the surroundings of at least one of the first and second optical surfaces and the alignment portions are arranged separately. In this case, the alignment portions may be formed only at a necessary location. For example, if the alignment portion is a protrusion in shape, the material of the alignment portion may be reduced.

In yet another aspect of the present invention, the shape of the alignment portion is any one of a round column shape, a quadrangular prism shape and a shape having a slope with respect to a lens optical axis. Here, in the shape which has a slope with respect to the lens optical axis, the slope includes not only a flat surface but also a curved surface.

In yet another aspect of the present invention, at least one alignment portion is provided in the surroundings of at least one of the first and second optical surfaces and is formed in a shape to surround the optical surface. In this case, since a contact area between the alignment portion and the mold becomes large, the lens may be stably positioned with respect to the mold.

In yet another aspect of the present invention, the shape of the alignment portion is any one of a shape which has a surface parallel to a lens optical axis and a shape which has a slope with respect to the lens optical axis.

In yet another aspect of the present invention, the alignment portion is defined higher than the optical surface, whereby damage to the optical surface may be prevented.

In yet another aspect of the present invention, lens is made of resin. In this case, the alignment portion may be formed easily together with the molding of the lens body.

In yet another aspect of the present invention, the lens includes a glass substrate and a resin portion formed on at least one of surfaces of the glass substrate, and wherein the alignment portion is formed in the resin portion. In this case, the alignment portion may be formed together with the molding of the resin portion.

In yet another aspect of the present invention, the lens includes a diaphragm at least on the surface of the lens or inside the lens. In this case, entering of light into an outer peripheral portion of the lens including the alignment portion and the like may be prevented. Therefore, production of stray light caused by incident light to into the outer peripheral portion of the lens may be prevented.

In yet another aspect of the present invention, the lens is formed by dicing a wafer lens into a single piece. In this case, even if misalignment has occurred between an outer edge shape of the lens which has been divided into a single piece and the first and second optical surfaces, the lens may be positioned with high precision with respect to the holder member.

In order to achieve the above-described object, a method for manufacturing an image pickup lens unit according to the present invention is a method for manufacturing an image pickup lens unit, including: a lens which includes a first optical surface and a second optical surface formed on the opposite side of the first optical surface; and a holder member integrally molded to hold the lens therein with the first and second optical surfaces being exposed, wherein a forming mold for molding the holder member includes a first mold and a second mold; wherein the lens includes an alignment portion provided outside of any one of the first and second optical surfaces and positions the lens with respect to the first or the second mold; wherein any one of the first and second molds has a positioning portion which faces the alignment portion and positions the lens; and wherein the method includes a process of inserting the lens in the first or second mold so that at least a part of the positioning portion is in contact with an inner surface of the alignment portion of the lens, a process of performing mold clamp in a state in which the lens is positioned with respect to the first or second mold, a process of flowing resin in a state in which the lens is kept inside of the first and the second molds to mold the holder member, and a process of relatively opening the first and the second molds and taking the image pickup lens unit out.

According to the manufacturing method described above, since the lens includes the alignment portion, the lens may be positioned with high precision with respect to the mold during molding of the holder member. Further, since the positioning of the lens with respect to the mold may be performed using the alignment portion provided outside the optical surface, heat and pressure produced during molding of the holder member are reduced by the positioning portion. Therefore, occurrence of degradation, such as distortion, in the optical surface of the lens during molding of the holder member may be prevented. Since the lens is positioned with respect to the mold by the inside of the alignment portion, the size of an opening of the image pickup lens unit may be reduced as compared with a case in which the lens is positioned outside the alignment portion.

In a specific aspect of the present invention, in the method for manufacturing an image pickup lens unit, at least two alignment portions are provided in the surroundings of at least one of the first and second optical surfaces and the alignment portions are arranged separately.

In another aspect of the present invention, the positioning portion includes a support surface which protrudes or extends further than an inscribed circle of the positioning portion in the surroundings of the first or second optical surface and prevents rotation of the alignment portion around a lens optical axis. In this case, not only decentering and movement in a height direction (the direction parallel to the lens optical axis) of the lens but also the rotation of lens may also be restricted.

In yet another aspect of the present invention, at least one alignment portion is provided in the surroundings of at least one of the first and second optical surfaces and is formed in a shape to surround the optical surface.

In yet another aspect of the present invention, the positioning portion of the lens includes a mechanism for sucking the lens. In this case, the lens may be positioned stably.

BRIEF DESCRIPTION OF DRAWINGS

FIG. 4 is a flowchart illustrating a manufacturing procedure of the image pickup lens unit illustrated in FIG. 1.

FIGS. 5A and 5B are cross-sectional views illustrating placement of the lens in the mold by the transport device.

FIGS. 15A-15D are diagrams illustrating an image pickup lens unit and the like according to a fifth embodiment.

FIGS. 20A-20D are diagrams illustrating the image pickup lens unit according to the eighth embodiment.

DESCRIPTION OF EMBODIMENTS

First Embodiment

Figure 1A:
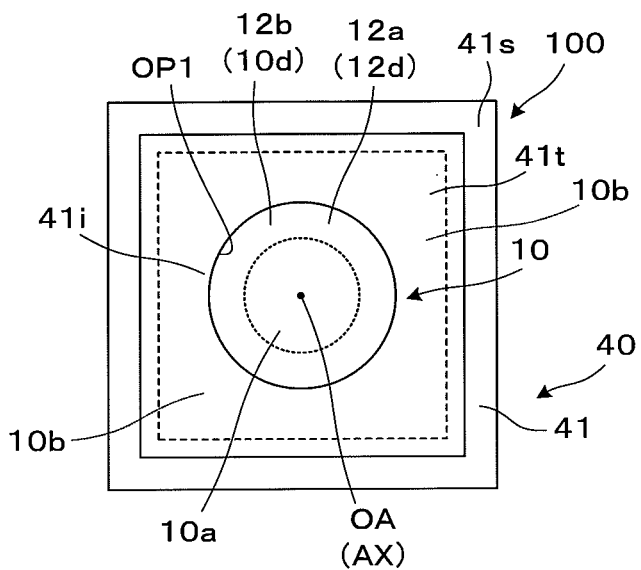
FIGS. 1A, 1B and 1C are a plan view, a side view and a rear view which illustrate an imaging lens unit according to a first embodiment.

Hereinafter, a method for manufacturing an image pickup lens unit according to a first embodiment of the present invention and an image pickup lens unit obtained by this method will be described with reference to the drawings.

As illustrated in FIGS. 1A to 1C, 2A to 2C and other figures, an image pickup lens unit 100 includes a compound or hybrid lens 10 and a rectangular or square frame shaped holder member 40 which supports the lens 10.

The lens 10 is, for example, formed by dicing a lens wafer or a wafer lens (a wafer shaped base material) in which a plurality of lenses are arranged in two dimensions, into a single piece. As illustrated in FIGS. 2A to 2C, 3A to 3C and other figures, the lens 10 is rectangular or square in shape and is formed as a plate. The lens 10 is a compound lens in which a plate-shaped glass substrate 11 is disposed between a first lens layer 12 and a second lens layer 13 which are made of resin.

The glass substrate 11 is an optically transparent plate. The glass substrate 11 is not necessarily made of glass and may be replaced by a substrate made of, for example, a resin material. The glass substrate 11 may have a function as, for example, an IR cut filter.

The first lens layer 12 includes a circular lens body portion 12a disposed at the central portion near a lens optical axis OA and a rectangular or square frame portion 12b extending around the lens body portion 12a. The lens body portion 12a is, for example, an aspherical lens portion and has a first optical surface 12d on the side of a front or external surface to be exposed. The optical surface herein means a portion having an optical function, i.e., a surface having an effective diameter. The frame portion 12b is a flat layer which has a first frame surface 10d on the side of the front surface. The first frame surface 10d is a flat surface which extends vertically to the lens optical axis OA. The first optical surface 12d which is inside and the first frame surface 10d which is outside form a first surface of the lens 10. The first lens layer 12 is made of, for example, curable resin with reflow heat resistance. Examples of the curable resin include thermosetting resin, photocuring resin and radiation curable resin.

Similarly, the second lens layer 13 includes a circular lens body portion 13a disposed at the central portion near the lens optical axis OA and a rectangular or square frame portion 13b extending around the lens body portion 13a. The lens body portion 13a is, for example, an aspherical lens portion and has a second optical surface 13e on the side of the front or external surface to be exposed. The frame portion 13b is a flat layer which has a second frame surface 10e on the side of the front surface. The second frame surface 10e is a flat surface which extends vertically to the lens optical axis OA. The second optical surface 13e which is inside and the second frame surface 10e which is outside form a second surface of the lens 10. Like the first lens layer 12, the second lens layer 13 is made of, for example, curable resin with reflow heat resistance.

In the lens 10 described above, the upper lens body portion 12a, the lower lens body portion 13a and the central portion of the glass substrate 11 disposed between these lens body portions constitute a central optical portion 10a which functions as a lens. Further, in the lens 10, the upper frame portion 12b, the lower frame portion 13b and a peripheral portion of the glass substrate 11 disposed between these frame portions constitute a flange portion 10b (an outer peripheral portion) which extends in the surroundings or vicinity of the central optical portion 10a and is circular at the inside thereof and is rectangular at the outside thereof.

The first lens layer 12 and the second lens layer 13 may be made of thermoplastic resin instead of curable resin. In that case, however, it is desirable that the first lens layer 12 and the second lens layer 13 are thermally stable during molding of the holder member 40 which will be described later and have heat characteristics not to be easily softened with heat during molding of the holder member 40.

The lens 10 includes alignment portions 14 on the frame portion 13b of the second lens layer 13. The alignment portions 14 are integrated with the frame portion 13b. Specifically, the alignment portions 14 are disposed outside the second optical surface 13e, i.e., outside the effective diameter, at four places on the diagonal lines of the lens 10, and at four places along the circumference at regular intervals. That is, the alignment portion 14 is constituted by divided plural alignment portions 14. Each alignment portion 14 is, for example, a round column-shaped projection vertically disposed on the surface outside the second optical surface 13e (the second frame surface 10e). That is, the alignment portion 14 has a stepped portion projecting outside the second optical surface 13e with respect to the second frame surface 10e of the frame portion 13b which is the outer surrounding portion extending from the outer edge of the second optical surface 13e. With this configuration, alignment in the direction vertical to the lens optical axis OA may be performed easily and reliably by using a set of a plurality of alignment portions 14. These alignment portions 14 are formed integrally outside the second optical surface 13e and made of the same resin material as that of the second lens layer 13.

Figure 2A:
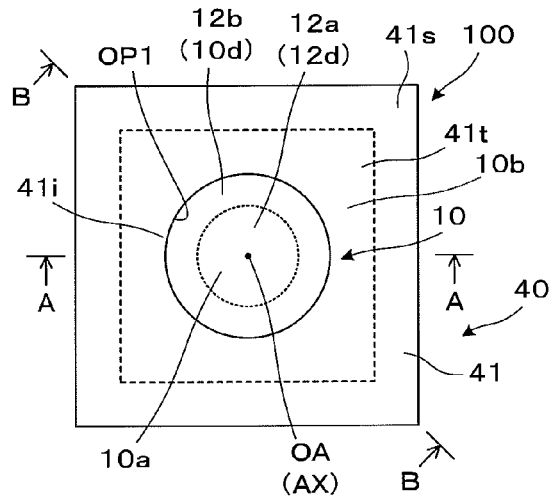
FIGS. 2A, 2B and 2C are a plan view, a cross-sectional view along the arrow direction of A-A and a cross-sectional view along the arrow direction of B-B which illustrate the image pickup lens unit of FIG. 1.
Figure 2C:
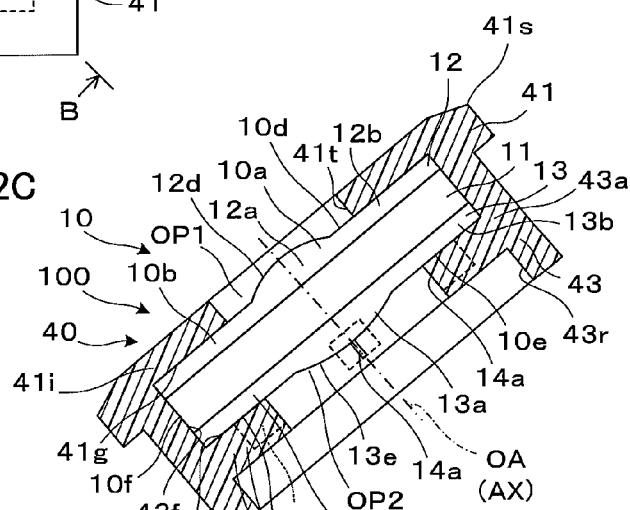
Figure 2B:
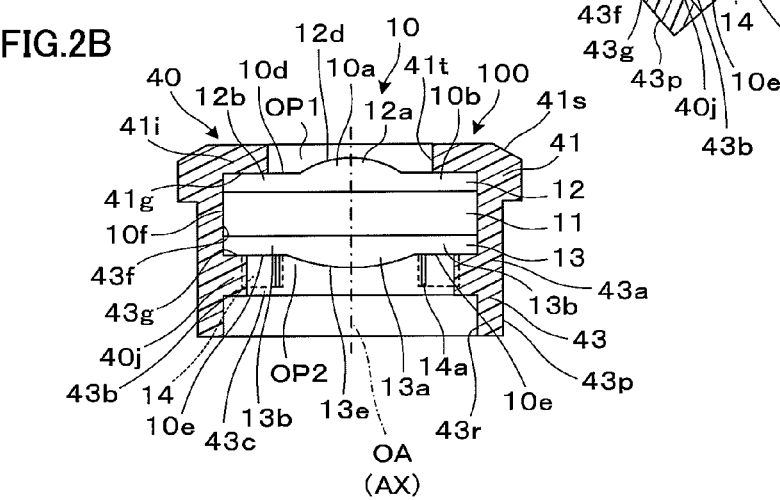

As illustrated in FIG. 2C, in the image pickup lens unit 100 in a state in which the lens 10 is kept inside through injection molding of the holder member 40, a part of the inside of the alignment portions 14 is exposed from the holder member 40. Although details thereof will be described later, this is because a second mold 61 (see FIG. 6) for molding the holder member 40 molds the holder member 40 in a state in which the second mold 61 is in contact with an exposed portion 14a which is a part of an inner side surface 14b (see FIGS. 3B and 3C) among side surfaces 14b of the alignment portion 14 for the support of the lens 10.

With reference to FIGS. 1A to 1C and 2A to 2C again, the holder member 40 which supports the lens 10 is made of resin having heat resistance to withstand at least a heat treatment which will be described later. Preferably, for example, the holder member 40 is made of thermoplastic resin having reflow heat resistance (for example, LCP (liquid crystal polymer), PPA (polyphthalamide) and the like). Here, the holder member may be colored black. In such a case, the holder member has an effect to block excessive light at the outer peripheral portion. The holder member 40 includes a rectangular or square plate shaped upper portion 41 and a quadrangular prism shaped side wall portion 43. The lens 10 is retained or supported and fixed inside the holder member 40 in a fitted manner. Although details will be described later, the holder member 40 is formed by injection molding of resin, and is formed as an integrated single member. Since the lens 10 and the holder member 40 are made of materials having reflow heat resistance, it is possible to process the image pickup lens unit 100 having heat resistance in a reflow process.

The holder member 40 retains the flange portion 10b of the lens 10 from the periphery to surround the same. That is, the upper portion 41 of the holder member 40 faces an upper first frame surface 10d of the lens 10 and restricts upward movement of the lens 10 along the lens optical axis OA. The side wall portion 43 faces four side surfaces 10f of the lens 10 and restricts lateral movement of the lens 10 vertical to the lens optical axis OA. At the same time, the side wall portion 43 faces the lower second frame surface 10e of the lens 10 and restricts downward movement of the lens 10 along the lens optical axis OA. In this manner, since the holder member 40 which is a single member contacts closely to the periphery of the flange portion 10b of the lens 10, the movement of the lens 10 with respect to the holder member 40 may be prevented reliably. Since the holder member 40 is in close contact with the lens surface without any gap, ghost generated by the light entering through the gap may be reduced.

Regarding the upper portion 41, the lower inner surface 41g contacts closely to a peripheral side area of the first frame surface 10d of the lens 10. A circular opening OP1 is formed at the center of the upper portion 41, and an annular edge portion 40i surrounding the opening OP1 is arranged to shield the vicinity or surroundings of the first optical surface 12d of the lens 10 so as to function as a kind of diaphragm.

The side wall portion 43 includes a rectangular tubular shaped wall body portion 43a and a rectangular fixing portion 43b provided inside the wall body portion 43a. The former wall body portion 43a is connected integrally with the upper portion 41 at an upper end thereof. An inner surface 43f of an upper portion of the wall body portion 43a contacts closely to the side surface 10f of the lens 10. The latter fixing portion 43b is provided to extend inward from the central portion in the up-down direction of the wall body portion 43a along the lens optical axis OA and is formed as a plate which is circular at the inside thereof and is rectangular at the outside thereof. Regarding the fixing portion 43b, the upper inner surface 43g contacts closely to the peripheral side area of the second frame surface 10e of the lens 10. An annular edge portion 40j formed at the center of the fixing portion 43b and surrounding an opening OP2 is arranged to shield the vicinity or surroundings of the optical surface 13e of the lens 10 so as to function as a kind of diaphragm.

Regarding the upper first surface of the lens 10, surface portions except for the finally exposed first and second optical surfaces 12d and 13e, and except for an area near the first and second optical surfaces 12d and 13e with which first and second molds 51 and 61 are in contact during molding of the holder member 40 are brought into contact with fluid resin before curing during injection molding of the holder member 40. Therefore, when resin cures, for example, the inner surface 41g of the upper portion 41 of the holder member 40 adheres to the first frame surface 10d of the lens 10 and the inner surface 43g of the fixing portion 43b adheres to the second frame surface 10e of the lens 10. Especially, the surface of the lens 10 is made of resin and, for example, the first frame surface 10d of the lens 10 and the inner surface 41g of the upper portion 41 of the holder member 40 are welded and bonded strongly to each other with the surface of the first frame surface 10d of the lens 10 being softened with heat during injection molding of the holder member 40. That is, the first frame surface 10d and the inner surface 41g are joined directly without using an adhesive. Similarly, the side surface 10f of the lens 10 and the inner surface 43f of the side wall portion 43 of the holder member 40 are joined directly without using an adhesive, and the second frame surface 10e of the lens 10 and the inner surface 43g of the fixing portion 43b of the holder member 40 are joined directly without using an adhesive. Regarding the fixing portion 43b of the holder member 40, the side surface 14b except a part of the side surface 14b of the alignment portions 14 of the lens 10 illustrated in FIGS. 3B, 3C and other figures (the exposed portion 14a) and a bottom surface 14c are joined directly without using an adhesive. A portion of the fixing portion 43b to be joined with the bottom surface 14c of the alignment portion 14 is thinned.

In the thus-configured image pickup lens unit 100, since the holder member 40 contacts closely to the periphery of the lens 10 without any gap, ghost and flare caused by the light entering from the side surface 10f of the lens 10 may be prevented. Since there is no unnecessary gap in the side surface 10f and the like of the lens 10, the size of the image pickup lens unit 100 may be reduced and thus it becomes easy to satisfy exterior specification required when the image pickup lens unit 100 is supposed to be mounted on a final product, such as an image pickup device. Deterioration in dimensional accuracy due to deformation during mold release or due to contraction of the holder member in a prior art holder may also be reduced.

Although the lens 10 is a compound lens in the above description, the entire lens 10 may be made of a single resin material. In a case in which the lens 10 is a compound lens, the resin-made lens layers 12 and 13 may be arranged at the central side and the glass substrate 11 may be exposed at the outermost edge of the lens 10.

Hereinafter, with reference to a manufacturing procedure illustrated in FIG. 4 and other figures, a method for manufacturing the image pickup lens unit 100 illustrated in FIG. 1 will be described.

First, as illustrated in FIG. 5A, by suitably operating a mold device 90 provided with a forming mold 91 which includes a first mold (a fixed mold) 51 on a fixed side and a second mold (a movable mold) 61 on a movable side to move the second mold 61 to a retracted position, the molds 51 and 61 are placed in their open state (step S11 of FIG. 4).

Figure 3A:
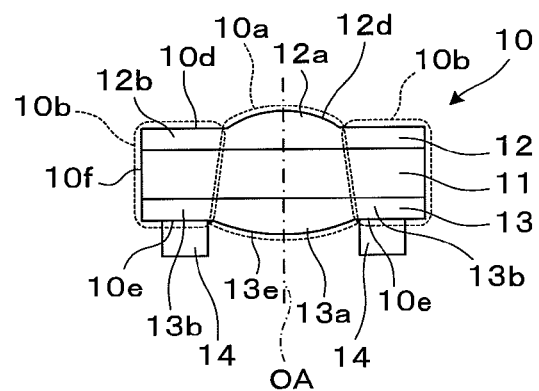
FIGS. 3A, 3B and 3C are a cross-sectional view along the arrow direction of A-A, a cross-sectional view along the arrow direction of B-B and a rear view which illustrate a lens which constitutes the image pickup lens unit of FIG. 1.
Figure 3B:
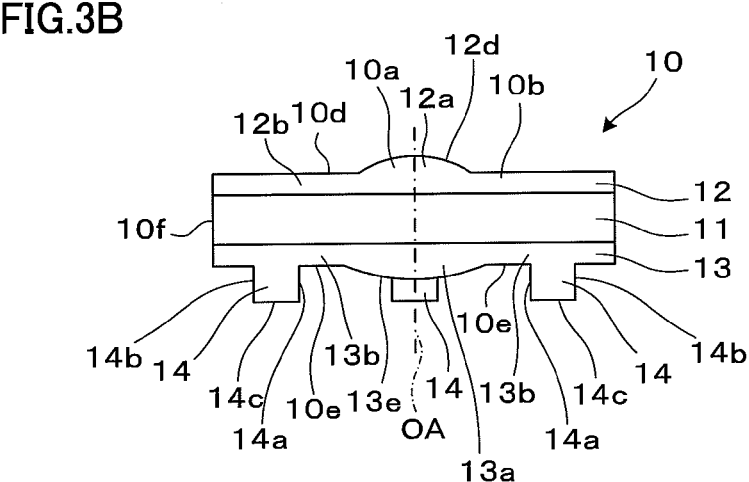
Figure 3C:
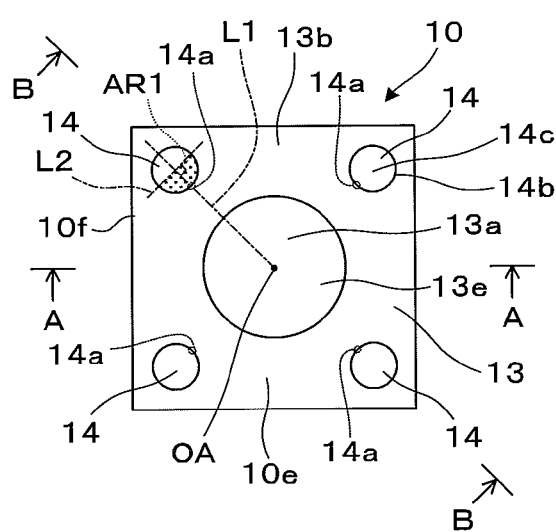

The first mold (the fixed mold) 51 includes a first molding portion 59 provided substantially along a parting surface 51a. The first molding portion 59 is formed at an end portion 54 of a mold portion 53 fixed in an embedded manner to a hole 52c of a mold plate 52 of the first mold 51 and at the mold plate 52. The end portion 54 of the mold portion 53 is a support portion for the lens 10 and includes a resin block portion 55 on the outer periphery side thereof. The second mold (the movable mold) 61 includes a second molding portion 69 which faces the first molding portion 59 and is recessed from a parting surface 61a. The second molding portion 69 is formed at an end portion 64 of a mold portion 63 fixed in an embedded manner to a hole 62c of a mold plate 62 of the second mold 61 and at the mold plate 62. The end portion 64 of the mold portion 63 is a support portion for the lens 10 and includes a positioning portion 65 on the outer periphery side thereof. The positioning portion 65 positions the lens 10 with respect to the second mold 61 by being in contact with the inside of the alignment portion 14 of the lens 10 and, in particular, in contact with the inner exposed portion 14a of the side surface 14b. Here, inside of the alignment portion 14 refers to, as illustrated in FIG. 3C, an area of the alignment portion 14 on the side of the second optical surface 13e (an inner area AR1) when a line L2 which passes the center of the alignment portion 14 and is vertical to a line L1 which connects the center of the second optical surface 13e and the center of the alignment portion 14 is drawn (see a hatched portion of stain finishing (i.e., fine dot pattern) area in the diagram). An exhaust hole or an air outlet hole 81 is formed in the second mold 61 to communicate with the mold portion 63. The air outlet hole 81 penetrates the axial center of the mold portion 63 and communicates with an unillustrated decompression device provided in the mold device 90. Since an opening is provided at an end of the air outlet hole 81, an end portion (a support portion) 64 of the mold portion 63 functions as a suction portion of the lens 10. That is, the air outlet hole 81 is capable of exhausting or expelling air outside at suitable timing by the decompression device. The decompression device decompresses a space S2 adjoining the second optical surface 13e to suck the lens 10 placed on the end portion (the support portion) 64 of the mold portion 63, whereby the lens 10 may be fixed onto the positioning portion 65 with desired suction force. When, for example, removing the lens 10 from the second mold 61, if the user wants to cancel the fixation of the lens 10 with respect to the end portion 64, it is only necessary to stop decompression of the space S2.

Unillustrated groove-shaped resin injection paths are provided at the molds 51 and 61 on the side of the parting surfaces 51a and 61a. In addition, although a heating mechanism for heating the first and the second molds 51 and 61, a platen for pressing the first and the second molds 51 and 61 from behind and the like are also provided, illustration thereof are omitted to make understanding easy.

Then, a transport device 70 holding the lens 10 is moved to an upper position of the second molding portion 69 or the mold portion 63 provided in the second mold 61 (step S12 of FIG. 4). The transport device 70 includes an arm 71 which removably retains the lens 10. The arm 71 is remotely driven by an unillustrated control drive device and the lens 10 is transported to a position to face the second molding portion 69. The arm 71 may mechanically nip the lens 10 or, for example, may suck the lens 10 with negative pressure.

Figure 6A:
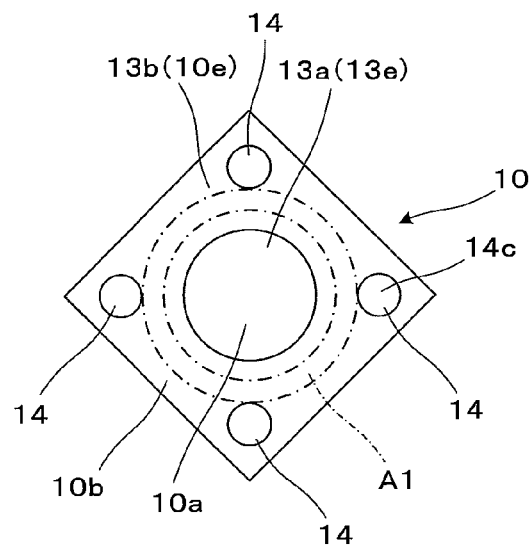
FIGS. 6A and 6B are conceptual diagrams illustrating the alignment portions of the lens and the positioning portion of the mold.
Figure 6B:
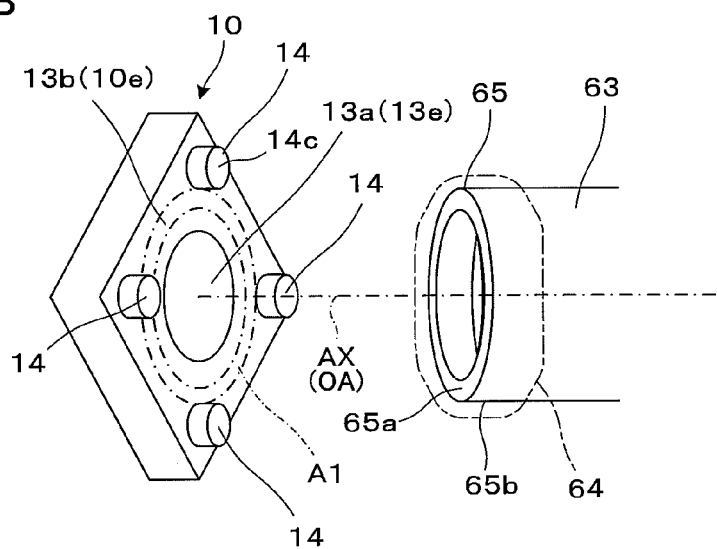

Further, as illustrated, the arm 71 of the transport device 70 is made to approach until the lens 10 approaches the second molding portion 69. The lens 10 held by the arm 71 is fitted so that the inside of the alignment portion 14 of the lens 10 and the outside of the positioning portion 65 provided in the end portion (the support portion) 64 of the mold portion 63 of the second mold 61 are in contact with each other. Specifically, as illustrated in FIGS. 6A and 6B, the lens 10 is fitted such that a contact area A1 of the second frame surface 10e of the lens 10 on the side further toward the second optical surface 13e than the alignment portion 14 and a support end surface 65a of the positioning portion 65 are in contact with each other. Since the length of the alignment portion 14 in the direction parallel to the lens optical axis OA is shorter than the depth of the second molding portion 69 which faces the bottom surface 14c, the bottom surface 14c is not in contact with an end surface of the mold plate 62 (which corresponds to the second molding portion 69). When the lens 10 is fitted into the positioning portion 65, the alignment portion 14 and the positioning portion 65 are in the line contact state. Specifically, the exposed portion 14a of the side surface 14b of the alignment portion 14 of the lens 10 and the support side surface 65b of the positioning portion 65 of the second mold 61 are in the line contact state. As described above, centering is performed to the lens 10 fitted on the second molding portion 69 by the positioning portion 65. Thus, the lens optical axis OA of the lens 10 and an axis AX of the mold portion 63 or the second molding portion 69 substantially coincide. Next, the unillustrated decompression device is operated and the second mold 61 is made to suck the lens 10. After the lens 10 is sucked, the state of the arm 71 is switched to a release state. The lens 10 released from the arm 71 is placed on the second molding portion 69 and, at the same time, is supported while being aligned on the second molding portion 69 (a placement process; step S13 of FIG. 4). Since the alignment portion 14 and the positioning portion 65 fit into each other, inclination of the lens 10 placed on the end portion (the support portion) 64 after the centering is performed is prevented and the lens optical axis OA is kept parallel with the axis AX. Then, as illustrated in FIG. 5B, the transport device 70 is retracted from between the molds 51 and 61.

Figure 7A:
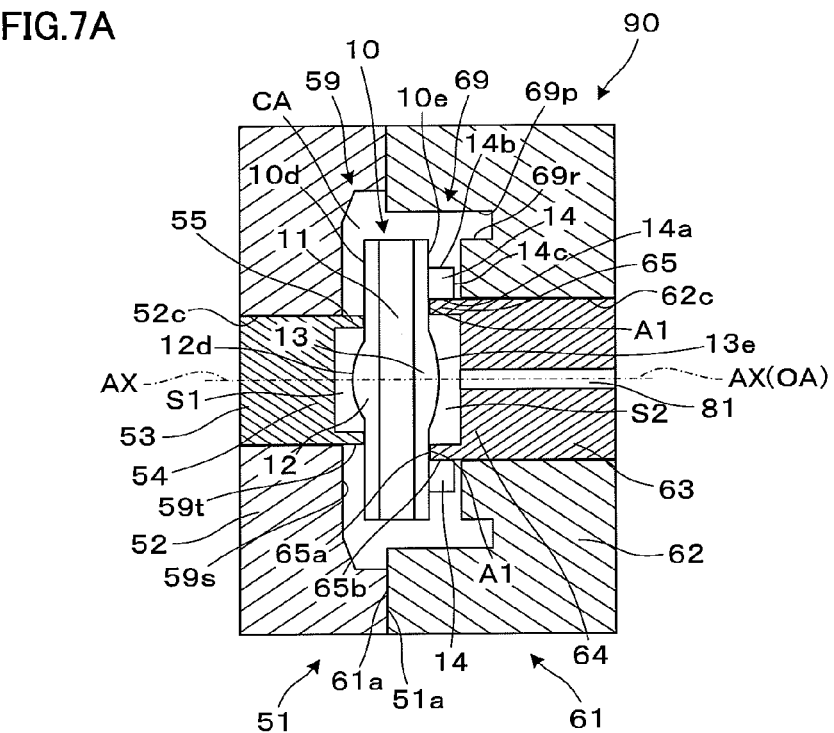
FIG. 7A is a cross-sectional view illustrating formation of a cavity in a manufacturing device and FIG. 7B is a cross-sectional view illustrating molding of a holder member.

Next, as illustrated in FIG. 7A, a cavity CA which is a mold space for the holder member 40 is formed between the first mold 51 and the second mold 61 by moving the second mold 61 to perform mold closing and mold clamping (a mold space formation process; step S14 of FIG. 4). At this time, the first molding portion 59 provided in the first mold 51 and the second molding portion 69 provided in the second mold 61 are aligned with each other and made to engage each other. Here, transfer surfaces 59s and 59t for molding an external surface 41s, an inner surface 41t and the like of the holder member 40 illustrated in FIGS. 1A to 1C, and the like are formed in the first molding portion 59. In the second molding portion 69 on the side of the second mold 61, transfer surfaces 69p, 69r and the like for molding an external surface 43p, an inner surface 43r and the like of the holder member 40 are formed. At the time of fitting the lens 10 into the positioning portion 65, the lens 10 may be released from the arm 71 while being sucked and may be drawn into the positioning portion 65 by suction force to perform positioning.

Here, on the side of the first molding portion 59 provided in the first mold 51, an annular resin block portion 55 is formed at the end portion (the support portion) 54 of the mold portion 53. The resin block portion 55 contacts closely to the innermost circumference portion of the flange portion 10b of the lens 10 so as to prevent flow resin MP from entering a space S1 adjoining the optical surface 12d in a molding process which will be described later (see FIG. 7B). After the mold clamping, the resin block portion 55 presses the lens 10 toward the second molding portion 69 side to play a role of stabilizing the lens 10 within the cavity CA and preventing rattling.

On the side of the second molding portion 69 provided in the second mold 61, an annular positioning portion 65 is formed at the end portion (the support portion) 64 of the mold portion 63 (see FIG. 6B). The positioning portion 65 positions the lens 10 with respect to the second mold 61 and, at the same time, contacts closely to the flange portion 10b of the lens 10 so as to prevent the flow resin MP from entering the space S2 adjoining the optical surface 13e. When the cavity CA as a molding space is formed by mold clamping, the positioning portion 65 is brought into contact with the innermost circumferential portion of the flange portion 10b of the lens 10 and gently presses the lens 10 toward the first mold 51 side, thereby stabilizing the lens 10 within the cavity CA and preventing rattling.

Figure 1B:
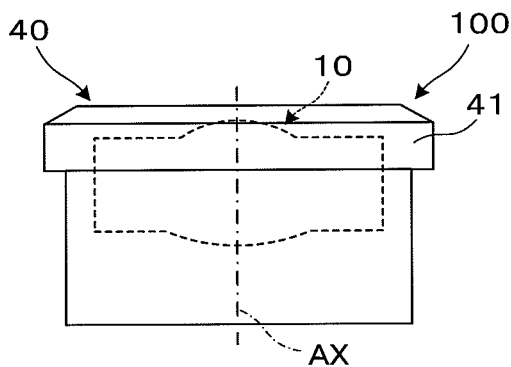
Figure 1C:
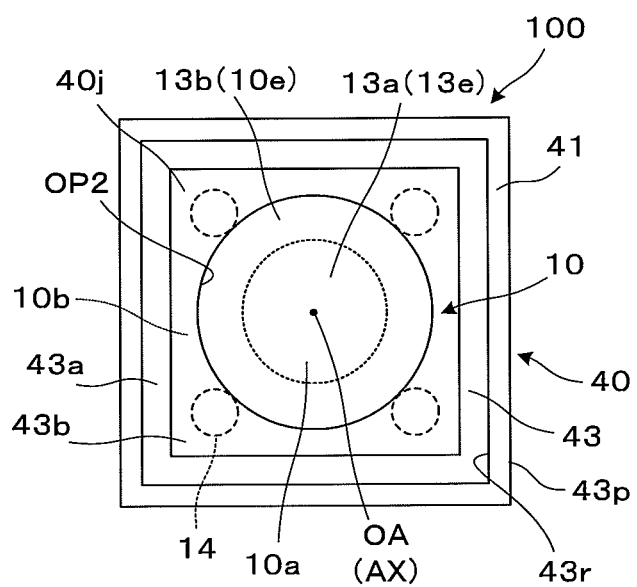
Figure 7B:
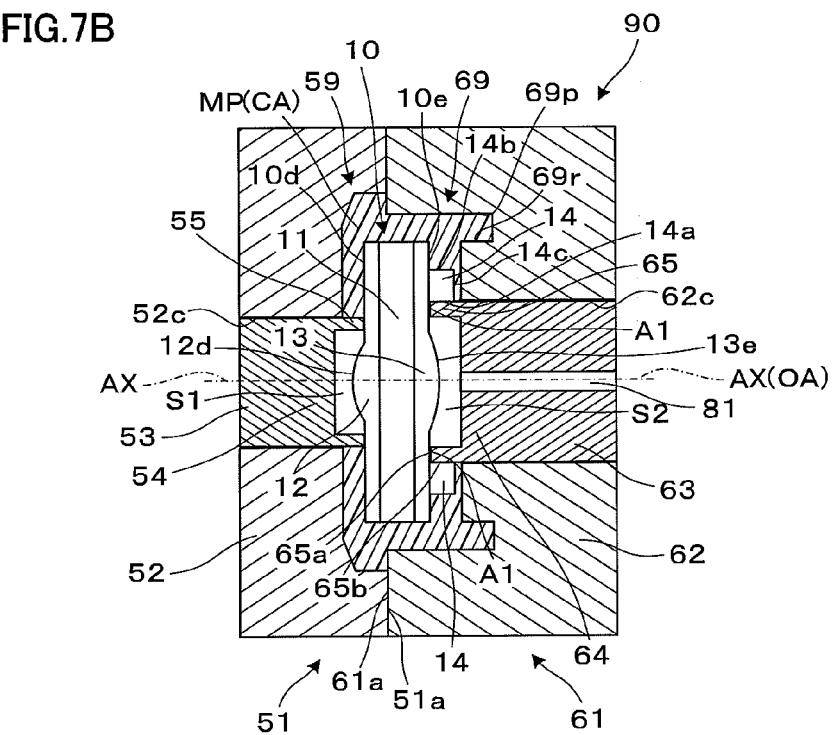

Next, as illustrated in FIG. 7B, the cavity CA which is the molding space is filled with flow resin MP which is to be a material of the holder member 40 via an unillustrated runner. In this manner, the first frame surface 10d, the side surface 10f and the second frame surface 10e of the flange portion 10b of the lens 10 is covered with resin. The resin is then cured by controlling temperature to mold the holder member 40 (a molding process; step S15 of FIG. 4). In this manner, the image pickup lens unit 100 in which the lens 10 is fixed while being supported between the openings OP1 and OP2 of the holder member 40 as illustrated in FIGS. 1A to 1C and other figures is completed. At this time, the resin block portion 55 and the positioning portion 65 provided in the first and second molding portions 59 and 69 prevent the flow resin MP from entering the spaces S1 and S2, resulting in playing a role of forming the openings OP1 and OP2 in the holder member 40.

Figure 8A:
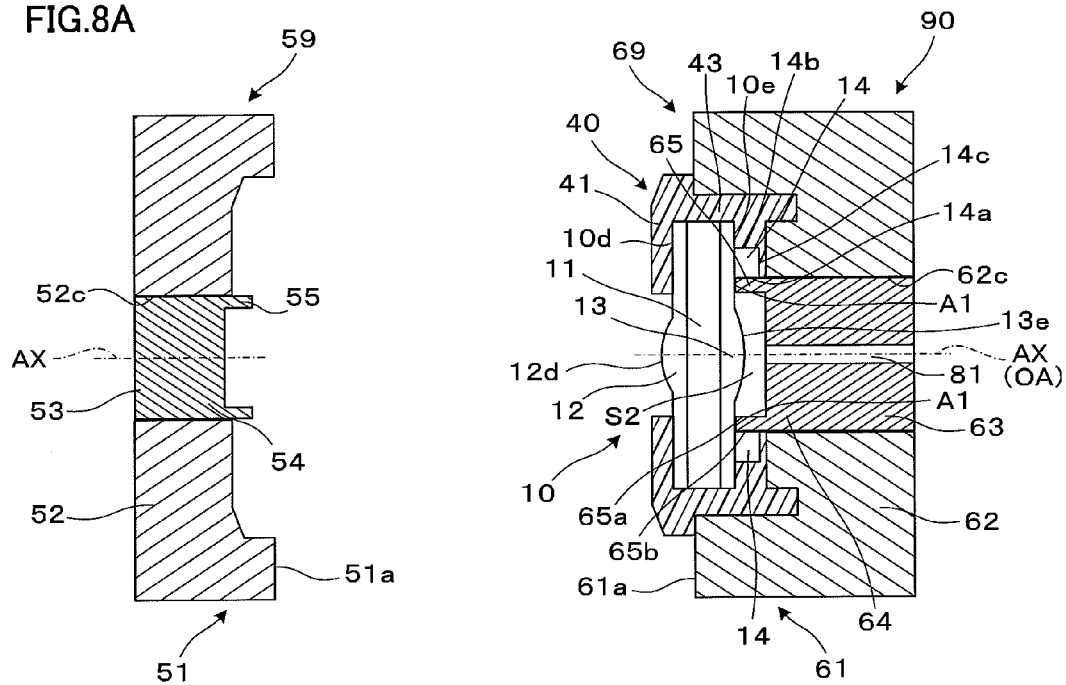
FIG. 8A is a cross-sectional view illustrating mold opening in the manufacturing device and FIG. 8B is a cross-sectional view illustrating removal of the image pickup lens unit.
Figure 8B:
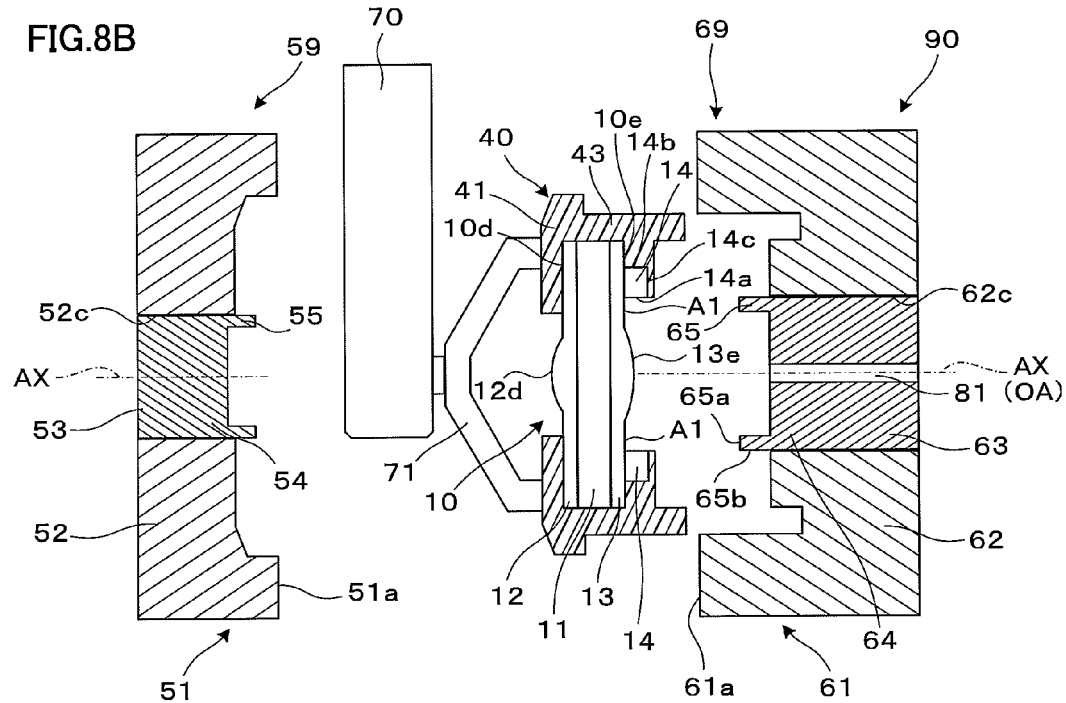
Figure 9A:
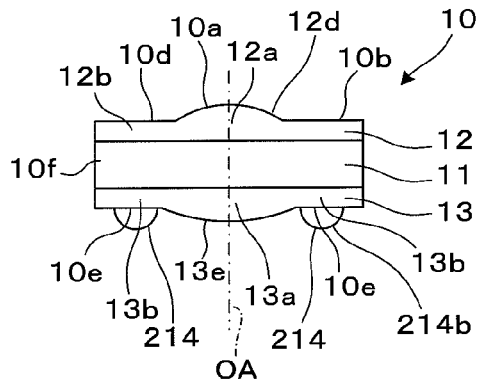
FIGS. 9A-9D are diagrams illustrating an image pickup lens unit and the like according to a second embodiment.
Figure 9B:
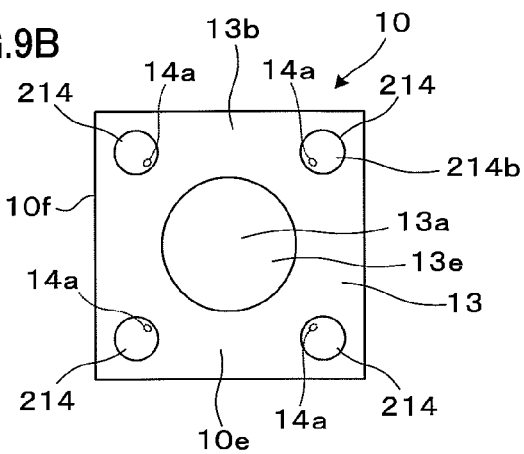
Figure 9C:
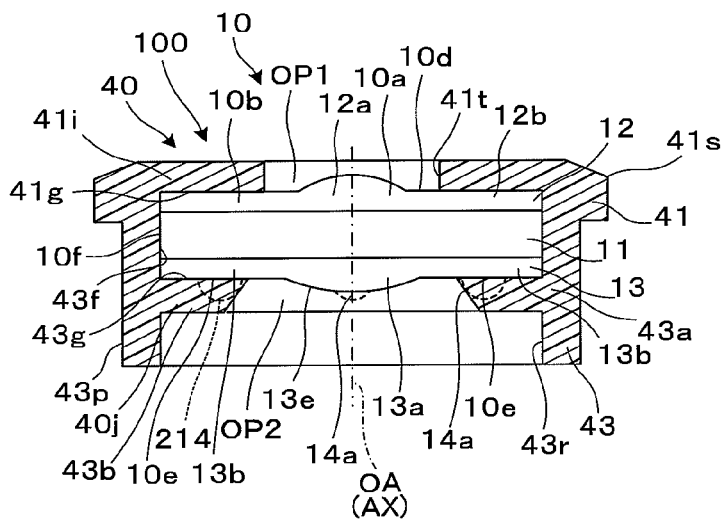
Figure 9D:
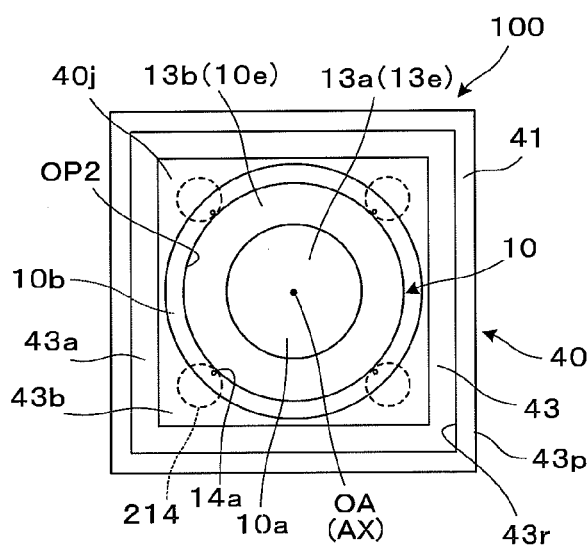

Next, as illustrated in FIG. 8A, by mold opening, in which the second mold 61 is separated from the first mold 51, the second mold 61 is placed in a retracted state (step S16 of FIG. 4). Then, the space S2 is decompressed and the image pickup lens unit 100 remaining in the second mold 61 is pushed to be released using an unillustrated ejector pin or the like provided in the second mold 61. In this manner, the image pickup lens unit 100 as a finished product may be taken out from the second mold 61 (step S17 of FIG. 4). At this time, with the operation to push out the image pickup lens unit 100 from the second molding portion 69, an unillustrated runner portion is separated from the holder member 40 of the image pickup lens unit 100. The image pickup lens unit 100 released from the second mold 61 is taken out of the mold device 90 by the transport device 70 as illustrated in FIG. 8B.

According to the image pickup lens unit 100 of the first embodiment, since the lens 10 includes the alignment portions 14, the lens 10 is positioned with high precision with respect to the second mold 61 during molding of the holder member 40, and the holder member 40 and the lens 10 are positioned with each other with high precision. Further, since the positioning of the lens 10 with respect to the second mold 61 may be performed using the alignment portions 14 provided outside the second optical surface 13e, influence of the heat and pressure produced by the second mold 61 and the resin during molding of the holder member 40 on the second optical surface 13e of the lens 10 may be reduced. Therefore, occurrence of degradation, such as distortion, in the second optical surface 13e of the lens 10 during molding of the holder member 40 may be prevented. Since the lens 10 is positioned with respect to the second mold 61 inside the alignment portions 14, the size of the opening OP2 of the image pickup lens unit 100 may be reduced as compared with a case in which the lens 10 is positioned outside the alignment portions 14.

Instead of providing the positioning portion 14 as in the present embodiment, a bending portion may be provided on an outer edge of the second optical surface 13e and positioning is performed by using the second mold 61 at the bending portion. In the case of this method, however, since the second optical surface 13e of the lens 10 and the bending portion continue each other, there is a possibility that distortion may occur on the optical surface when the lens 10 is pressed by the mold during molding of the holder member 40.

Second Embodiment

Hereinafter, a method for manufacturing an image pickup lens unit and the like according to a second embodiment will be described. The method for manufacturing the image pickup lens unit and the like according to the second embodiment is a variation of the method for manufacturing the image pickup lens unit 100 and the like of the first embodiment and, therefore, portions not especially described should be the same as those of the first embodiment.

Figure 10A:
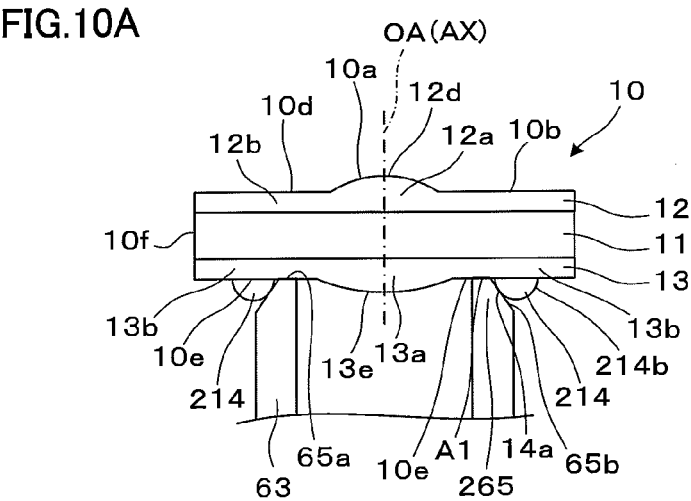
FIGS. 10A and 10B are diagrams illustrating a method for manufacturing the image pickup lens unit of FIG. 9.
Figure 10B:
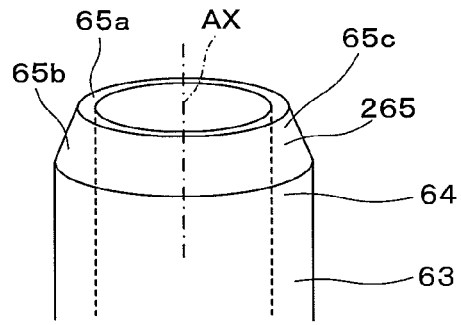
Figure 11A:
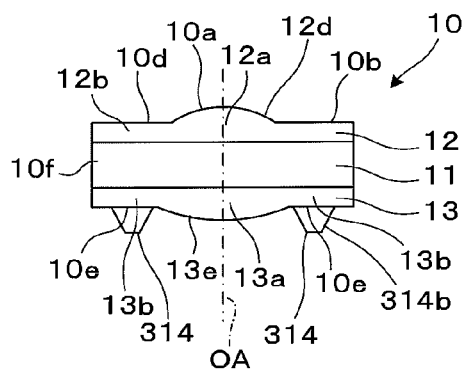
FIGS. 11A-11D are diagrams illustrating an image pickup lens unit and the like according to a third embodiment.
Figure 11B:
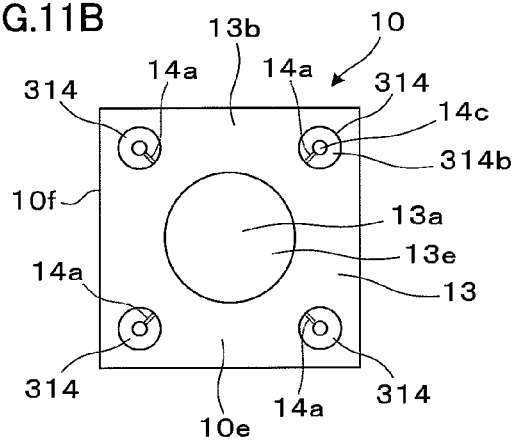
Figure 11C:
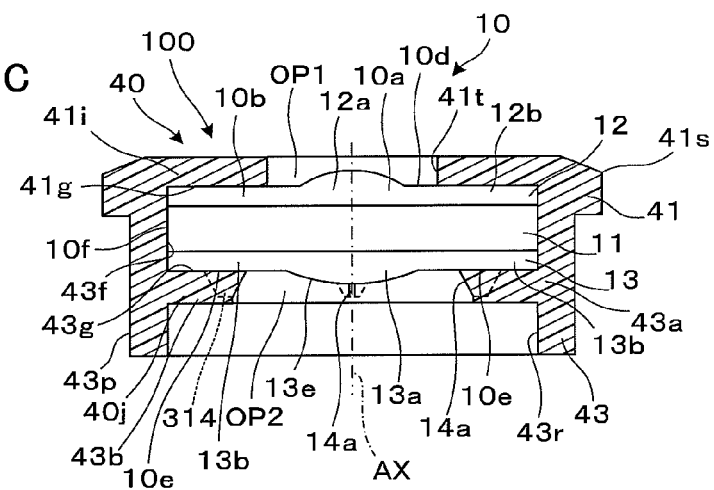
Figure 11D:
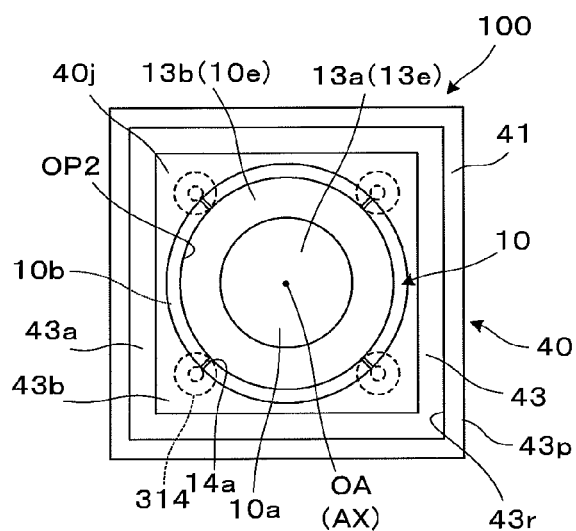

As illustrated in FIGS. 9A to 9D, in the case of the second embodiment, alignment portions 214 of a lens 10 are protrusion in shape and have slopes with respect to a lens optical axis OA. Specifically, the alignment portions 214 are hemispherical in shape and the slopes thereof are curved surfaces 214b. As illustrated in FIGS. 10A and 10B, a positioning portion 265 of a second mold 61 is circular in shape and has a tapered end portion 65c. As illustrated in FIG. 10A and other figures, when the lens 10 is positioned with respect to the second mold 61, an exposed portion 14a on the inside of the curved surface 214b of the alignment portion 214 and a support side surface 65b on the outside of the positioning portion 265 make point contact. In the case of the second embodiment, since the positioning is performed by point contact, even if machining accuracy of the second mold 61 (the positioning portion 265) is not high (even if an angle is acute or obtuse to some extent) as compared with other embodiments or the like, positioning can be performed.

Third Embodiment

Hereinafter, a method for manufacturing an image pickup lens unit and the like according to a third embodiment will be described. The method for manufacturing the image pickup lens unit and the like according to the third embodiment is a variation of the method for manufacturing the image pickup lens unit 100 and the like of the first embodiment and, therefore, portions not especially described should be the same as those of the first embodiment.

Figure 12A:
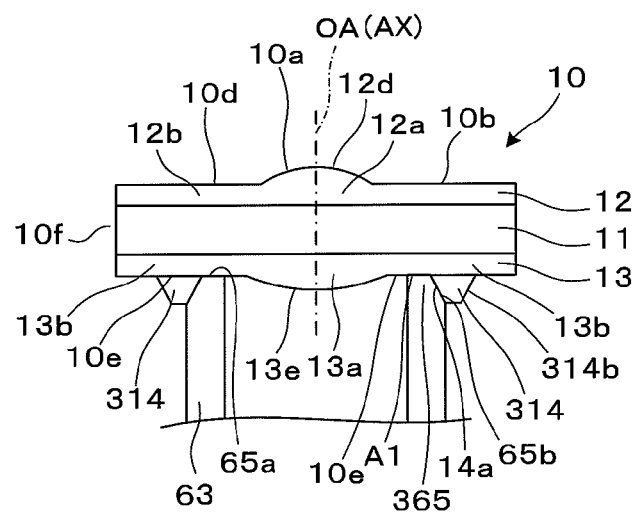
FIGS. 12A and 12B are diagrams illustrating a method for manufacturing the image pickup lens unit of FIG. 11.
Figure 12B:
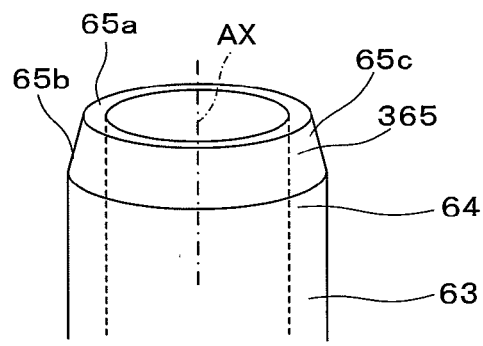

As illustrated in FIGS. 11A to 11D, in the case of the third embodiment, alignment portions 314 of a lens 10 are protrusion in shape and have slopes with respect to a lens optical axis OA. Specifically, the alignment portions 314 are truncated cone in shape and the slopes thereof are flat surfaces (surfaces having no curvature about particular directions) 314b. As illustrated in FIGS. 12A and 12B, a positioning portion 365 of a second mold 61 is circular in shape and has a tapered end portion 65c. As illustrated in FIG. 12A and other figures, when the lens 10 is positioned with respect to the second mold 61, an exposed portion 14a on the inside of the flat surface 314b of the alignment portion 314 and a support side surface 65b on the outside of the positioning portion 365 make line contact. In the case of the third embodiment, since the flat surface 314b of the alignment portion 314 guides the support side surface 65b of the positioning portion 365 of the second mold 61, the lens 10 may be easily inserted in the second mold 61 as compared with the first embodiment and other embodiments.

Fourth Embodiment

Hereinafter, a method for manufacturing an image pickup lens unit and the like according to a fourth embodiment will be described. The method for manufacturing the image pickup lens unit and the like according to the fourth embodiment is a variation of the method for manufacturing the image pickup lens unit 100 and the like of the first embodiment and, therefore, portions not especially described should be the same as those of the first embodiment.

Figure 13A:
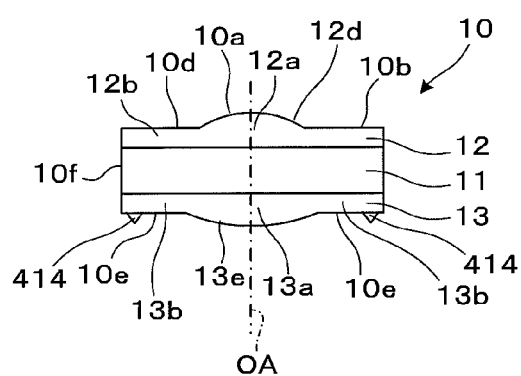
FIGS. 13A-13D are diagrams illustrating an image pickup lens unit and the like according to a fourth embodiment.
Figure 13B:
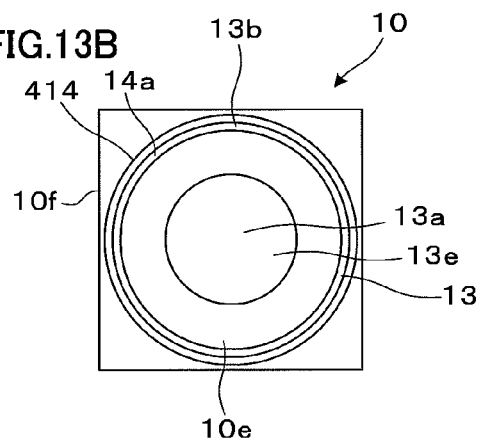
Figure 13C:
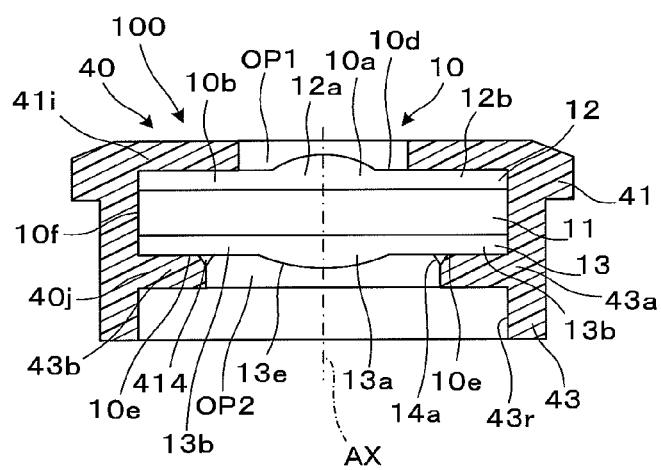
Figure 13D:
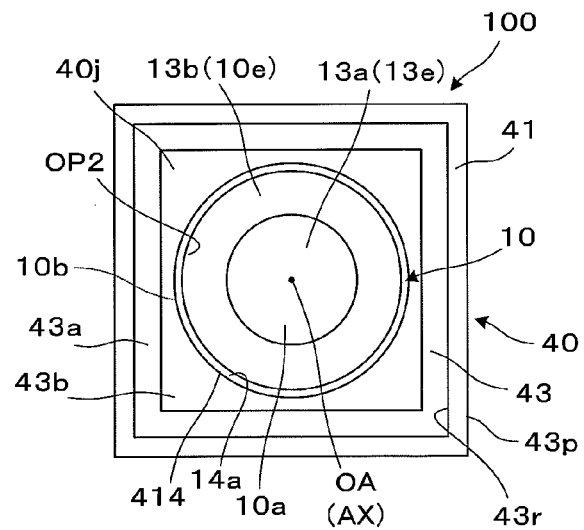
Figure 14A:
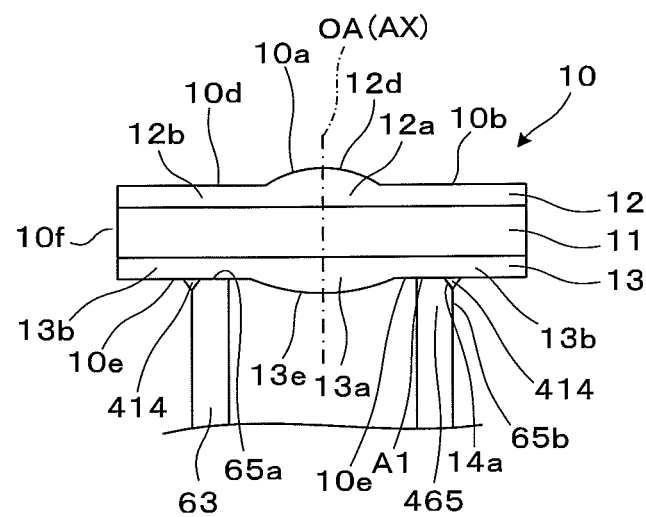
FIGS. 14A and 14B are diagrams illustrating a method for manufacturing the image pickup lens unit of FIG. 13.
Figure 14B:
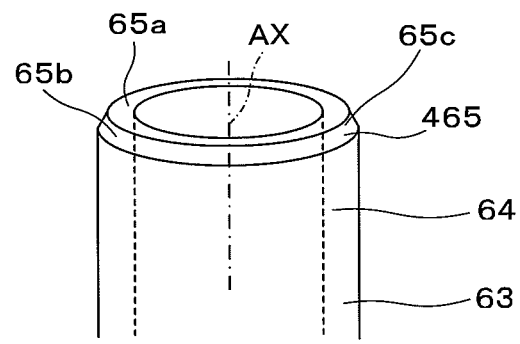

As illustrated in FIGS. 13A to 13D, in the case of the fourth embodiment, an alignment portion 414 of a lens 10 is provided to surround the surroundings of a second optical surface 13e on the outside of the second optical surface 13e of the lens 10. The alignment portion 414 is annular protrusion in shape, and has a slope with respect to a lens optical axis OA. Specifically, as illustrated in FIG. 13A and other figures, the alignment portion 414 has a triangular cross section which is parallel to the lens optical axis OA. As illustrated in FIGS. 14A and 14B, a positioning portion 465 of a second mold 61 is circular in shape and has a tapered end portion 65c. As illustrated in FIG. 14A and other figures, when the lens 10 is positioned with respect to the second mold 61, an exposed portion 14a on the inside of the alignment portion 414 and a support side surface 65b on the outside of the positioning portion 465 make surface contact. In the case of the fourth embodiment, since the exposed portion 14a and the support side surface 65b make surface contact, the lens 10 may be positioned stably with respect to the second mold 61 as compared with the first embodiment or other embodiments.

Fifth Embodiment

Hereinafter, a method for manufacturing an image pickup lens unit and the like according to a fifth embodiment will be described. The method for manufacturing the image pickup lens unit and the like according to the fifth embodiment is a variation of the method for manufacturing the image pickup lens unit 100 and the like of the fourth embodiment and, therefore, portions not especially described should be the same as those of the fourth embodiment.

Figure 16A:
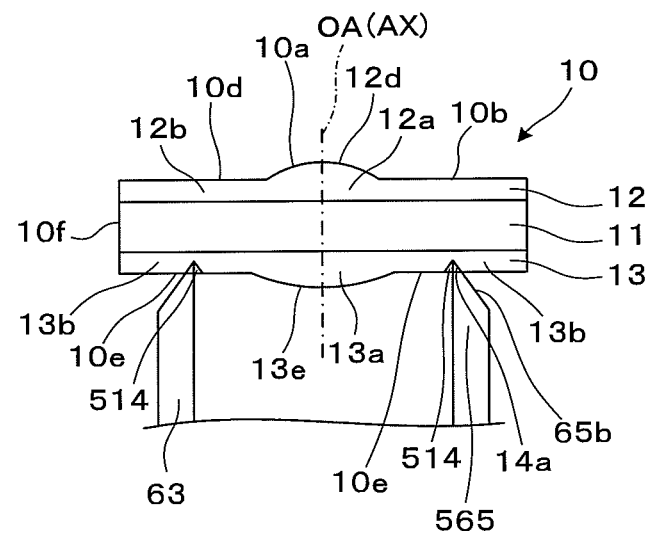
FIGS. 16A and 16B are diagrams illustrating a method for manufacturing the image pickup lens unit of FIG. 15.
Figure 16B:
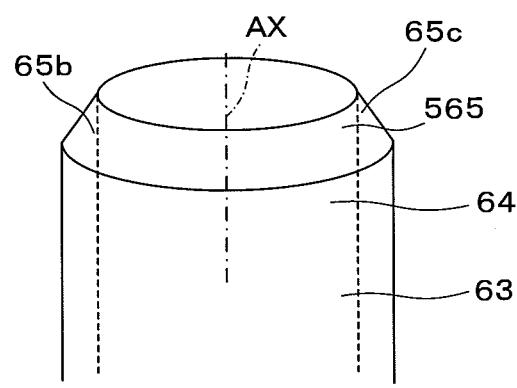

As illustrated in FIGS. 15A to 15D, in the case of the fifth embodiment, an alignment portion 514 of a lens 10 is provided to surround the surroundings of a second optical surface 13e on the outside of the second optical surface 13e of the lens 10. The alignment portion 514 is annular recess in shape, and has a slope with respect to a lens optical axis OA. Specifically, as illustrated in FIG. 15A and other figures, the alignment portion 514 is a groove and has a triangular cross section which is parallel to the lens optical axis OA. As illustrated in FIGS. 16A and 16B, a positioning portion 565 of a second mold 61 is circular in shape and has an acutely tapered end portion 65c. As illustrated in FIG. 16A and other figures, when the lens 10 is positioned with respect to the second mold 61, an exposed portion 14a on the inside of the alignment portion 514 and a support side surface 65b on the outside of the positioning portion 565 make surface contact. In the case of the fourth embodiment, like the fourth embodiment, since the exposed portion 14a and the support side surface 65b make surface contact, the lens 10 may be positioned stably with respect to the second mold 61 as compared with the first embodiment or other embodiments.

Sixth Embodiment

Hereinafter, a method for manufacturing an image pickup lens unit and the like according to a sixth embodiment will be described. The method for manufacturing the image pickup lens unit and the like according to the sixth embodiment is a variation of the method for manufacturing the image pickup lens unit 100 and the like of the first embodiment and, therefore, portions not especially described should be the same as those of the first embodiment and other embodiments.

Figure 17:
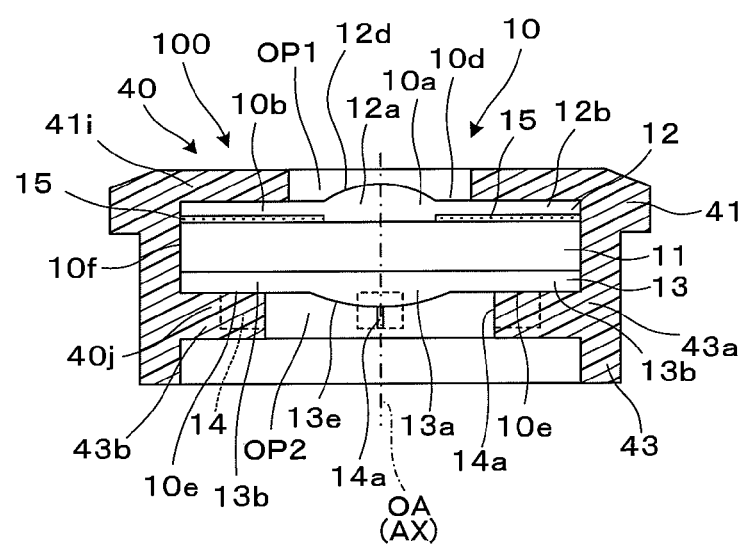
FIG. 17 is a cross-sectional view illustrating an image pickup lens unit according to a sixth embodiment.

As illustrated in FIG. 17, in the case of the sixth embodiment, a lens 10 has a diaphragm 15 between a glass substrate 11 and a first lens layer 12, i.e., inside the lens 10. With this configuration, entering of light into a flange portion 10b of the lens 10 including alignment portions 14 and the like may be prevented. Therefore, production of stray light caused by incident light into the flange portion 10b of the lens 10 may be prevented. In the lens 10 of the sixth embodiment, the diaphragm 15 may be provided on a surface of the first lens layer 12. Alternatively, the diaphragm 15 may be provided on a second lens layer 13 side.

Seventh Embodiment

Hereinafter, a method for manufacturing an image pickup lens unit and the like according to a seventh embodiment will be described. The method for manufacturing the image pickup lens unit and the like according to the seventh embodiment is a variation of the method for manufacturing the image pickup lens unit 100 and the like of the first embodiment and, therefore, portions not especially described should be the same as those of the first embodiment.

Figure 18:
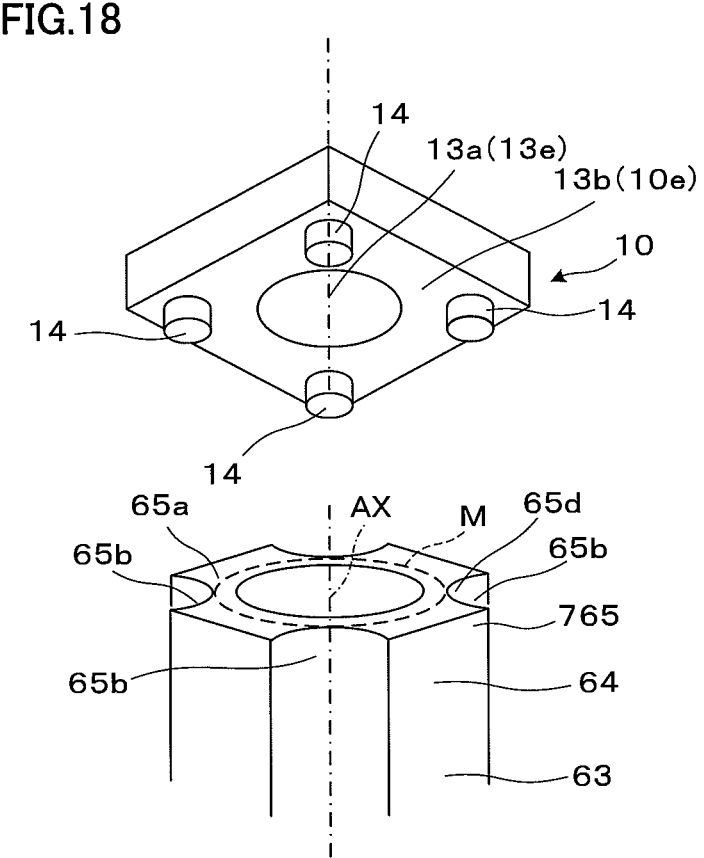
FIG. 18 is a conceptual diagram illustrating a method for manufacturing an image pickup lens unit and the like according to a seventh embodiment.
Figure 19A:
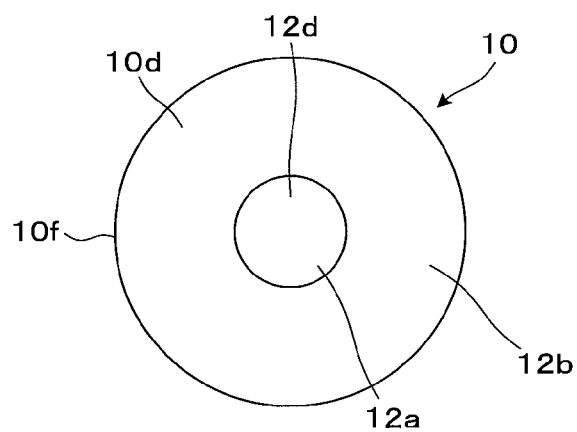
FIGS. 19A-19C are diagrams illustrating a lens which constitutes an image pickup lens unit according to an eighth embodiment.
Figure 19B:
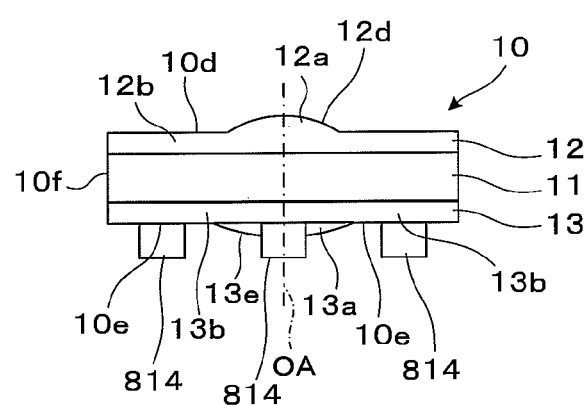
Figure 19C:
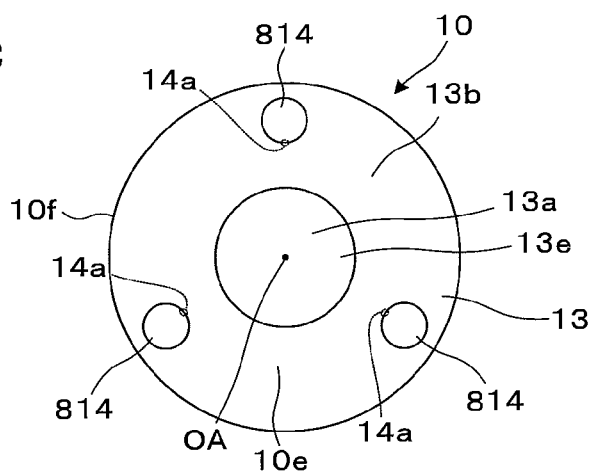

As illustrated in FIG. 18, in the case of the seventh embodiment, a positioning portion 765 includes support surfaces 65d provided with portions projecting outside an inscribed circle M of the positioning portion 765 (in a direction away from an axis AX). The support surfaces 65d are included in support side surfaces 65b. In the case of the seventh embodiment, when a lens 10 is positioned with respect to a second mold 61, an exposed portion 14a on the inside of an alignment portion 14 and the support side surface 65b on the outside of the positioning portion 765 make surface contact. At this time, the support surface 65d provided in the positioning portion 765 functions as a stopper and movement of the alignment portion 14 in the rotational direction is restricted. With this configuration, not only decentering and movement in a height direction (the direction parallel to the lens optical axis OA) of the lens 10 but also the rotation of lens 10 may also be restricted.

Eighth Embodiment

Hereinafter, a method for manufacturing an image pickup lens unit and the like according to an eighth embodiment will be described. The method for manufacturing the image pickup lens unit and the like according to the eighth embodiment is a variation of the method for manufacturing the image pickup lens unit 100 and the like of the first embodiment and, therefore, portions not especially described should be the same as those of the first embodiment.

Figure 21:
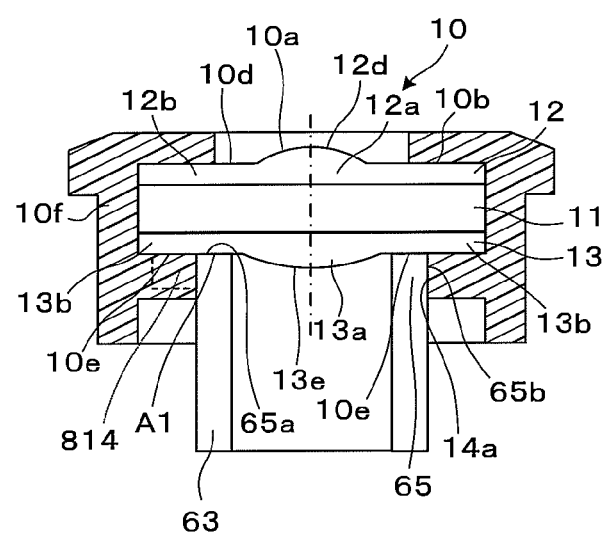
FIG. 21 is a diagram illustrating a method for manufacturing the image pickup lens unit of FIG. 20.

As illustrated in FIGS. 19A to 19C and 20A to 20D, in the case of the eighth embodiment, alignment portions 814 are arranged at three places at regular intervals along the circumference. In this manner, the amount of resin to be required is smaller than in the case of the first embodiment. As illustrated in FIG. 21, when a lens 10 is positioned with respect to a second mold 61, the lens 10 makes line contact with exposed portions 14a of the three alignment portions 814 and a support side surface 65b of the positioning portion 65. The holder member 40 of the image pickup lens unit 100 illustrated in FIG. 20A and other figures has a cylindrical outer shape. The outer shape of this holder member 40 may be suitably changed corresponding to the specification, and may be rectangular tubular as in the holder member 40 of the first embodiment and other embodiments. In the first to seventh embodiments, the outer shape of the holder member 40 may be cylindrical as in the eighth embodiment.

Although the present invention has been described with reference to the embodiments, the present invention is not limited to these embodiments. For example, in the embodiments described above, the lens 10 may be a single lens made of glass or resin.

In each of the embodiments described above, the shape and the structure of the lens 10 are illustrative only and may be changed suitably. For example, the lens 10 is not necessarily rectangular when viewed in a plan view but may be circular when viewed in a plan view.

In the first embodiment, although the mold device 90 is a lateral device which moves the second mold 61 in the left-right direction, the mold device 90 may be a vertical device which moves the second mold 61 in the up-down direction. In this case, it is not necessary to provide a suction mechanism like the air outlet hole 81.

In the embodiments described above, although thermoplastic resin is used as the resin material which constitutes the holder member 40, the material of the holder member 40 is not limited to the same; curable resin, such as thermosetting resin and photocuring resin, may also be used.

In the embodiments described above, plural molding portions may be provided in the mold so that holders may be molded for plural lenses at the same time. In this case, it is not necessary to arrange a member for alignment of the two molds in each molding portion and, for example, it is only necessary to use common alignment members for plural molding portions by, for example, providing taper pins and fitting holes in which the taper pins are to be fitted in each mold at two places in the entire mold.

Figure 22A:
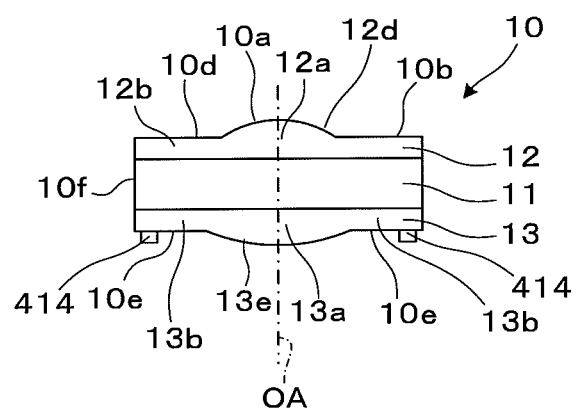
FIGS. 22A and 22B are cross-sectional views illustrating a modification of the lens which constitutes the image pickup lens unit according to the fourth embodiment.
Figure 22B:
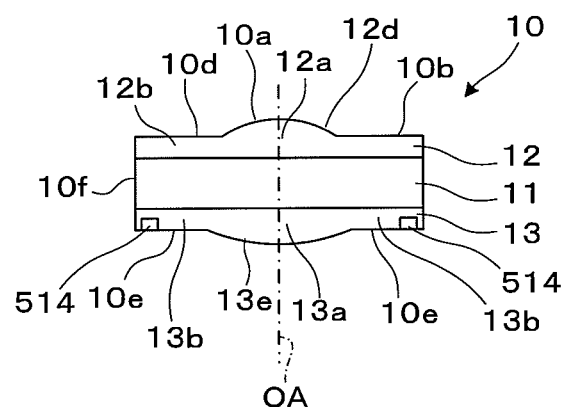

In the fourth and the fifth embodiments, the alignment portions 314 and 414 of the lens 10 have the shape with the slope with respect to the lens optical axis OA; however, as illustrated in FIGS. 22A and 22B, the alignment portions 314 and 414 may have the shape with surfaces parallel to the lens optical axis OA.

Figure 23:
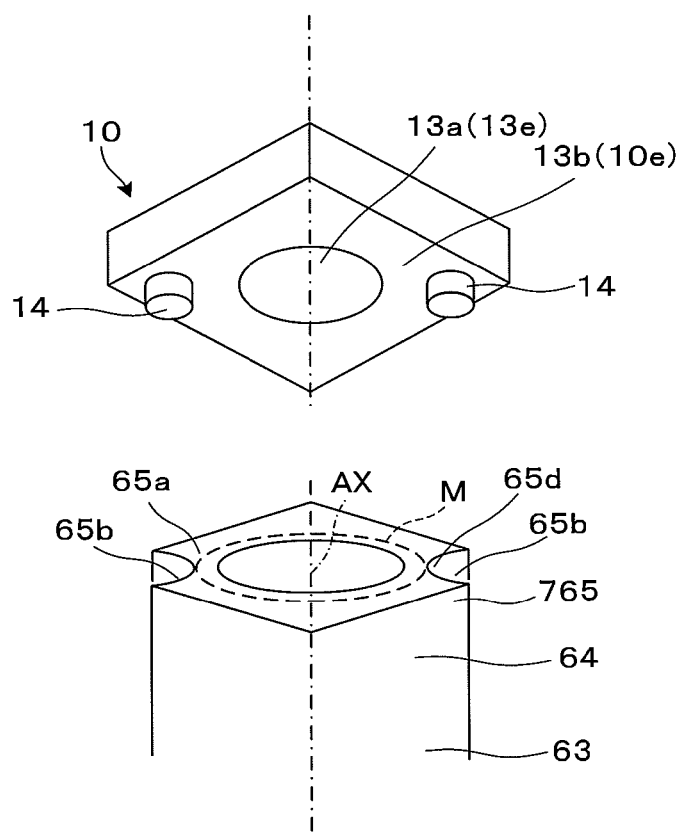
FIG. 23 is a conceptual diagram illustrating a modification of a method for manufacturing the image pickup lens unit and the like illustrated in FIG. 18.

In the seventh embodiment, the number of the alignment portions 14 of the lens 10 is not necessarily four but may be two as illustrated in FIG. 23. Alternatively, more than four alignment portions 14 may be provided.

In the embodiments described above, the holder member 40 is not formed in the exposed portions 14a at which the alignment portions 14 are in contact with the positioning portion 65 and is thus exposed; however, if the holder member 40 is molded in a state in which a slight gap exists between the alignment portions 14 and the positioning portion 65, a thin resin layer may be formed on the exposed portions 14a. This is because, although alignment is basically performed without any gap in many cases, in some cases, such as plural alignment portions 14 are provided, a partial deviation may be caused and a gap may be produced due to machining accuracy of the second mold 61. In this case, however, the gap is very slight and other portions are molded without any gap; therefore, no large problem may be caused.

In the embodiments described above, the positioning portion 65 may be provided in the first mold 51 on the fixed side instead of the second mold 61 on the movable side.

The invention claimed is:

1. An image pickup lens unit, comprising: a lens which includes a first optical surface and a second optical surface formed on the opposite side of the first optical surface; and a holder member integrally molded to hold the lens therein with the first and second optical surfaces being exposed,
   wherein the lens includes an alignment portion for positioning the lens with respect to a mold when the lens is placed in the mold which has a molding space for molding the holder member; and
   wherein the alignment portion is provided outside of any one of the first and second optical surfaces and at least a part of the inside of the alignment portion is exposed from the holder member.

2. The image pickup lens unit according to claim 1, wherein the alignment portion is formed integrally with a part outside of any one of the first and second optical surfaces of the lens.

3. The image pickup lens unit according to claim 1, wherein the alignment portion includes at least one of protrusion and recession in shape with respect to a surface other than the first or second optical surface of the lens.

4. The image pickup lens unit according to claim 1, wherein the alignment portion includes a stepped portion with respect to a flat surface of an outer peripheral portion extending from an outer edge of the first or second optical surface.

5. The image pickup lens unit according to claim 1, wherein at least two alignment portions are provided in the surroundings of at least one of the first and second optical surfaces and the alignment portions are arranged separately.

6. The image pickup lens unit according to claim 5, wherein the shape of each alignment portion is any one of a round column shape, a quadrangular prism shape and a shape having a slope with respect to a lens optical axis.

7. The image pickup lens unit according to claim 1, wherein at least one alignment portion is provided in the surroundings of at least one of the first and second optical surfaces and is formed in a shape to surround the at least one of the first and second optical surfaces.

8. The image pickup lens unit according to claim 7, wherein the shape of the alignment portion is any one of a shape which has a surface parallel to a lens optical axis and a shape which has a slope with respect to the lens optical axis.

9. The image pickup lens unit according to claim 1, wherein the lens is made of resin.

10. The image pickup lens unit according to claim 1, wherein the lens includes a glass substrate and a resin portion formed on at least one of surfaces of the glass substrate, and wherein the alignment portion is formed in the resin portion.

11. The image pickup lens unit according to claim 1, wherein the lens includes a diaphragm at least on a surface of the lens or inside the lens.

12. The image pickup lens unit according to claim 1, wherein the lens is formed by dicing a wafer lens into a single piece.

13. A method for manufacturing an image pickup lens unit, comprising: a lens which includes a first optical surface and a second optical surface formed on the opposite side of the first optical surface; and a holder member integrally molded to hold the lens therein with the first and second optical surfaces being exposed, wherein a forming mold for molding the holder member includes a first mold and a second mold;

wherein the lens includes an alignment portion provided outside of any one of the first and second optical surfaces and positions the lens with respect to the first or the second mold;

wherein any one of the first and second molds has a positioning portion which faces the alignment portion and positions the lens; and wherein the method includes:

a process of inserting the lens in the first or second mold so that at least a part of the positioning portion is in contact with an inner surface of the alignment portion of the lens, a process of performing mold clamp in a state in which the lens is positioned with respect to the first or second mold, a process of flowing resin in a state in which the lens is kept inside of the first and the second molds to mold the holder member, and a process of relatively opening the first and the second molds and taking the image pickup lens unit out.

14. The method for manufacturing an image pickup lens unit according to claim 13, wherein at least two alignment portions are provided in the surroundings of at least one of the first and second optical surfaces and the alignment portions are arranged separately.

15. The method for manufacturing an image pickup lens unit according to claim 14, wherein the positioning portion includes a support surface which protrudes further than an inscribed circle of the positioning portion in the surroundings of the first or second optical surface and prevents rotation of the alignment portions around a lens optical axis.

16. The method for manufacturing an image pickup lens unit according to claim 13, wherein at least one alignment portion is provided in the surroundings of at least one of the first and second optical surfaces and is formed in a shape to surround the at least one of the first and second optical surfaces.

17. The method for manufacturing an image pickup lens unit according to claim 13, wherein the positioning portion of the lens includes a mechanism for sucking the lens.

18. The method for manufacturing an image pickup lens unit according to claim 13, wherein the lens is formed by dicing a wafer lens into a single piece.

\* \* \* \* \*